(12) United States Patent
Sundarrajan et al.

(10) Patent No.: US 8,726,006 B2
(45) Date of Patent: *May 13, 2014

(54) SYSTEM AND METHOD FOR ESTABLISHING A VIRTUAL PRIVATE NETWORK

(75) Inventors: Prabakar Sundarrajan, Saratoga, CA (US); Junxiao He, Cupertino, CA (US); Ajay Soni, San Jose, CA (US); Shashidhara Nanjundaswamy, Bangalore (IN); Arkesh Kumar, Santa Clara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,630

(22) Filed: Aug. 21, 2012

(65) Prior Publication Data

US 2012/0317411 A1    Dec. 13, 2012

Related U.S. Application Data

(63) Continuation of application No. 12/794,446, filed on Jun. 4, 2010, now Pat. No. 8,261,057, which is a continuation of application No. 11/039,946, filed on Jan. 24, 2005, now Pat. No. 7,757,074.

(60) Provisional application No. 60/583,785, filed on Jun. 30, 2004.

(51) Int. Cl.
    *G06F 9/00* (2006.01)
(52) U.S. Cl.
    USPC .............................. 713/151; 726/15
(58) Field of Classification Search
    None
    See application file for complete search history.

(56) References Cited

U.S. PATENT DOCUMENTS

| | | | |
|---|---|---|---|
| 4,479,195 | A | 10/1984 | Herr et al. |
| 4,701,844 | A | 10/1987 | Thompson et al. |
| 4,885,680 | A | 12/1989 | Anthony et al. |
| 4,935,870 | A | 6/1990 | Burk et al. |

(Continued)

FOREIGN PATENT DOCUMENTS

| | | |
|---|---|---|
| CN | 1394042 | 1/2003 |
| CN | 1410905 A | 4/2003 |

(Continued)

OTHER PUBLICATIONS

Advisory Action for U.S. Appl. No. 11/161,656 dated Jul. 29, 2009.

(Continued)

*Primary Examiner* — Kaveh Abrishamkar
(74) *Attorney, Agent, or Firm* — Foley & Lardner LLP; Christopher J. McKenna

(57) ABSTRACT

A system and method for establishing a virtual private network (VPN) between a client and a private data communication network. An encrypted data communication session, such as a Secure Sockets Layer (SSL) data communication session, is established between a gateway and the client over a public data communication network. The gateway then sends a programming component to the client for automatic installation and execution thereon. The programming component operates to intercept communications from client applications destined for resources on the private data communication network and to send the intercepted communications to the gateway via the encrypted data communication session instead of to the resources on the private data communication network.

20 Claims, 4 Drawing Sheets

(56) References Cited

U.S. PATENT DOCUMENTS

| | | |
|---|---|---|
| 5,301,270 A | 4/1994 | Steinberg et al. |
| 5,307,413 A | 4/1994 | Denzer |
| 5,329,619 A | 7/1994 | Page et al. |
| 5,359,712 A | 10/1994 | Cohen et al. |
| 5,511,208 A | 4/1996 | Boyles et al. |
| 5,519,699 A | 5/1996 | Ohsawa |
| 5,521,940 A | 5/1996 | Lane et al. |
| 5,561,769 A | 10/1996 | Kumar et al. |
| 5,623,492 A | 4/1997 | Teraslinna |
| 5,625,793 A | 4/1997 | Mirza |
| 5,657,390 A | 8/1997 | Elgamal et al. |
| 5,671,226 A | 9/1997 | Murakami et al. |
| 5,708,656 A | 1/1998 | Noneman et al. |
| 5,742,829 A | 4/1998 | Davis et al. |
| 5,758,085 A | 5/1998 | Kouoheris et al. |
| 5,758,110 A | 5/1998 | Boss et al. |
| 5,761,431 A | 6/1998 | Gross et al. |
| 5,787,470 A | 7/1998 | DeSimone et al. |
| 5,812,668 A | 9/1998 | Weber |
| 5,815,462 A | 9/1998 | Konishi et al. |
| 5,819,020 A | 10/1998 | Beeler, Jr. |
| 5,822,524 A | 10/1998 | Chen et al. |
| 5,828,840 A | 10/1998 | Cowan et al. |
| 5,835,726 A | 11/1998 | Shwed et al. |
| 5,838,920 A | 11/1998 | Rosborough |
| 5,850,446 A | 12/1998 | Berger et al. |
| 5,852,717 A | 12/1998 | Bhide et al. |
| 5,864,837 A | 1/1999 | Maimone |
| 5,881,229 A | 3/1999 | Singh et al. |
| 5,889,863 A | 3/1999 | Weber |
| 5,893,150 A | 4/1999 | Hagersten et al. |
| 5,911,051 A | 6/1999 | Carson et al. |
| 5,918,244 A | 6/1999 | Percival |
| 5,925,100 A | 7/1999 | Drewry et al. |
| 5,931,917 A | 8/1999 | Nguyen et al. |
| 5,931,961 A | 8/1999 | Ranganathan et al. |
| 5,933,605 A | 8/1999 | Kawano et al. |
| 5,940,074 A | 8/1999 | Britt et al. |
| 5,943,424 A | 8/1999 | Berger et al. |
| 5,956,483 A | 9/1999 | Grate et al. |
| 5,958,016 A | 9/1999 | Chang et al. |
| 5,978,840 A | 11/1999 | Nguyen et al. |
| 5,983,208 A | 11/1999 | Haller et al. |
| 5,987,132 A | 11/1999 | Rowney |
| 5,987,482 A | 11/1999 | Bates et al. |
| 5,987,611 A | 11/1999 | Freund |
| 5,995,999 A | 11/1999 | Bharadhwaj |
| 5,996,076 A | 11/1999 | Rowney et al. |
| 5,999,179 A | 12/1999 | Kekic et al. |
| 5,999,525 A | 12/1999 | Krishnaswamy et al. |
| 6,002,767 A | 12/1999 | Kramer |
| 6,021,470 A | 2/2000 | Frank et al. |
| 6,023,724 A | 2/2000 | Bhatia et al. |
| 6,026,379 A | 2/2000 | Haller et al. |
| 6,026,413 A | 2/2000 | Challenger et al. |
| 6,026,440 A | 2/2000 | Shrader et al. |
| 6,029,175 A | 2/2000 | Chow et al. |
| 6,058,250 A | 5/2000 | Harwood et al. |
| 6,061,715 A | 5/2000 | Hawes |
| 6,061,769 A | 5/2000 | Kapulka et al. |
| 6,061,796 A | 5/2000 | Chen et al. |
| 6,067,569 A | 5/2000 | Khaki et al. |
| 6,072,870 A | 6/2000 | Nguyen et al. |
| 6,092,155 A | 7/2000 | Olnowich |
| 6,101,543 A | 8/2000 | Alden et al. |
| 6,112,085 A | 8/2000 | Garner et al. |
| 6,119,105 A | 9/2000 | Williams |
| 6,119,151 A | 9/2000 | Cantrell et al. |
| 6,122,403 A | 9/2000 | Rhoads |
| 6,128,627 A | 10/2000 | Mattis et al. |
| 6,131,120 A | 10/2000 | Reid |
| 6,141,686 A | 10/2000 | Jackowski et al. |
| 6,144,775 A | 11/2000 | Williams et al. |
| 6,157,955 A | 12/2000 | Narad et al. |
| 6,161,123 A | 12/2000 | Renouard et al. |
| 6,163,772 A | 12/2000 | Kramer et al. |
| 6,170,017 B1 | 1/2001 | Dias et al. |
| 6,173,325 B1 | 1/2001 | Kukreja |
| 6,175,869 B1 | 1/2001 | Ahuja et al. |
| 6,178,409 B1 | 1/2001 | Weber et al. |
| 6,182,139 B1 | 1/2001 | Brendel |
| 6,192,408 B1 | 2/2001 | Vahalia et al. |
| 6,219,669 B1 | 4/2001 | Haff et al. |
| 6,233,249 B1 | 5/2001 | Katseff et al. |
| 6,233,606 B1 | 5/2001 | Dujari |
| 6,233,619 B1 | 5/2001 | Narisi et al. |
| 6,236,652 B1 | 5/2001 | Preston et al. |
| 6,252,851 B1 | 6/2001 | Siu et al. |
| 6,253,027 B1 | 6/2001 | Weber et al. |
| 6,253,188 B1 | 6/2001 | Witek et al. |
| 6,253,327 B1 | 6/2001 | Zhang et al. |
| 6,256,773 B1 | 7/2001 | Bowman-Amuah |
| 6,272,146 B1 | 8/2001 | Bowater et al. |
| 6,272,148 B1 | 8/2001 | Takagi et al. |
| 6,272,556 B1 | 8/2001 | Gish |
| 6,282,172 B1 | 8/2001 | Robles et al. |
| 6,289,382 B1 | 9/2001 | Bowman-Amuah |
| 6,289,450 B1 | 9/2001 | Pensak et al. |
| 6,301,249 B1 | 10/2001 | Mansfield et al. |
| 6,304,915 B1 | 10/2001 | Nguyen et al. |
| 6,308,273 B1 | 10/2001 | Goertzel et al. |
| 6,321,235 B1 | 11/2001 | Bird |
| 6,321,337 B1 | 11/2001 | Reshef et al. |
| 6,324,525 B1 | 11/2001 | Kramer et al. |
| 6,324,582 B1 | 11/2001 | Sridhar et al. |
| 6,324,647 B1 | 11/2001 | Bowman-Amuah |
| 6,324,648 B1 | 11/2001 | Grantges, Jr. |
| 6,327,242 B1 | 12/2001 | Amicangioli et al. |
| 6,332,163 B1 | 12/2001 | Bowman-Amuah |
| 6,333,931 B1 | 12/2001 | LaPier et al. |
| 6,334,664 B1 | 1/2002 | Silverbrook |
| 6,339,832 B1 | 1/2002 | Bowman-Amuah |
| 6,345,239 B1 | 2/2002 | Bowman-Amuah |
| 6,363,363 B1 | 3/2002 | Haller et al. |
| 6,363,478 B1 | 3/2002 | Lambert et al. |
| 6,370,573 B1 | 4/2002 | Bowman-Amuah |
| 6,370,599 B1 | 4/2002 | Anand et al. |
| 6,373,950 B1 | 4/2002 | Rowney |
| 6,383,478 B1 | 5/2002 | Prokop et al. |
| 6,389,462 B1 | 5/2002 | Cohen et al. |
| 6,389,505 B1 | 5/2002 | Emma et al. |
| 6,398,359 B1 | 6/2002 | Silverbrook et al. |
| 6,405,364 B1 | 6/2002 | Bowman-Amuah |
| 6,412,000 B1 | 6/2002 | Riddle et al. |
| 6,415,329 B1 | 7/2002 | Gelman et al. |
| 6,425,057 B1 | 7/2002 | Cherkasova et al. |
| 6,427,132 B1 | 7/2002 | Bowman-Amuah |
| 6,427,187 B2 | 7/2002 | Malcolm |
| 6,431,777 B1 | 8/2002 | Silverbrook |
| 6,434,568 B1 | 8/2002 | Bowman-Amuah |
| 6,434,618 B1 | 8/2002 | Cohen et al. |
| 6,434,628 B1 | 8/2002 | Bowman-Amuah |
| 6,438,127 B1 | 8/2002 | Le Goff et al. |
| 6,438,594 B1 | 8/2002 | Bowman-Amuah |
| 6,442,571 B1 | 8/2002 | Haff et al. |
| 6,442,682 B1 | 8/2002 | Pothapragada et al. |
| 6,442,748 B1 | 8/2002 | Bowman-Amuah |
| 6,447,113 B1 | 9/2002 | Silverbrook et al. |
| 6,449,658 B1 | 9/2002 | Lafe et al. |
| 6,449,695 B1 | 9/2002 | Bereznyi et al. |
| 6,452,915 B1 | 9/2002 | Jorgensen |
| 6,452,923 B1 | 9/2002 | Gerszberg et al. |
| 6,473,794 B1 | 10/2002 | Guheen et al. |
| 6,473,802 B2 | 10/2002 | Masters |
| 6,477,580 B1 | 11/2002 | Bowman-Amuah |
| 6,477,665 B1 | 11/2002 | Bowman-Amuah |
| 6,484,143 B1 | 11/2002 | Swildens et al. |
| 6,484,206 B2 | 11/2002 | Crump et al. |
| 6,487,641 B1 | 11/2002 | Cusson et al. |
| 6,496,481 B1 | 12/2002 | Wu et al. |
| 6,496,776 B1 | 12/2002 | Blumberg et al. |
| 6,496,850 B1 | 12/2002 | Bowman-Amuah |
| 6,496,935 B1 | 12/2002 | Fink et al. |
| 6,502,102 B1 | 12/2002 | Haswell et al. |

(56) References Cited

U.S. PATENT DOCUMENTS

| | | | |
|---|---|---|---|
| 6,502,192 B1 | 12/2002 | Nguyen |
| 6,502,213 B1 | 12/2002 | Bowman-Amuah |
| 6,507,891 B1 | 1/2003 | Challenger et al. |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,553,129 B1 | 4/2003 | Rhoads |
| 6,553,377 B1 | 4/2003 | Eschelbeck et al. |
| 6,553,409 B1 | 4/2003 | Zhang et al. |
| 6,571,282 B1 | 5/2003 | Bowman-Amuah |
| 6,574,668 B1 | 6/2003 | Gubbi et al. |
| 6,574,688 B1 | 6/2003 | Dale et al. |
| 6,578,068 B1 | 6/2003 | Bowman-Amuah |
| 6,578,073 B1 | 6/2003 | Starnes et al. |
| 6,584,569 B2 | 6/2003 | Reshef et al. |
| 6,590,588 B2 | 7/2003 | Lincke et al. |
| 6,591,266 B1 | 7/2003 | Li et al. |
| 6,594,690 B2 | 7/2003 | Cantwell |
| 6,598,075 B1 | 7/2003 | Ogdon et al. |
| 6,601,057 B1 | 7/2003 | Underwood et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,606,663 B1 | 8/2003 | Liao et al. |
| 6,606,744 B1 | 8/2003 | Mikurak |
| 6,609,128 B1 | 8/2003 | Underwood |
| 6,611,262 B1 | 8/2003 | Suzuki |
| 6,611,522 B1 | 8/2003 | Zheng et al. |
| 6,611,822 B1 | 8/2003 | Beams et al. |
| 6,611,867 B1 | 8/2003 | Bowman-Amuah |
| 6,614,800 B1 | 9/2003 | Genty et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,618,359 B1 | 9/2003 | Chen et al. |
| 6,629,081 B1 | 9/2003 | Cornelius et al. |
| 6,631,986 B2 | 10/2003 | Silverbrook |
| 6,633,574 B1 | 10/2003 | Koch et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,248 B1 | 10/2003 | Jorgensen |
| 6,640,249 B1 | 10/2003 | Bowman-Amuah |
| 6,647,130 B2 | 11/2003 | Rhoads |
| 6,650,640 B1 | 11/2003 | Muller et al. |
| 6,652,089 B2 | 11/2003 | Silverbrook |
| 6,652,090 B2 | 11/2003 | Silverbrook |
| 6,662,221 B1 | 12/2003 | Gonda et al. |
| 6,662,357 B1 | 12/2003 | Bowman-Amuah |
| 6,664,978 B1 | 12/2003 | Kekic et al. |
| 6,671,818 B1 | 12/2003 | Mikurak |
| 6,678,734 B1 * | 1/2004 | Haatainen et al. ............ 709/230 |
| 6,681,029 B1 | 1/2004 | Rhoads |
| 6,687,732 B1 | 2/2004 | Bector et al. |
| 6,691,227 B1 | 2/2004 | Neves et al. |
| 6,697,824 B1 | 2/2004 | Bowman-Amuah |
| 6,697,844 B1 | 2/2004 | Chan et al. |
| 6,697,849 B1 | 2/2004 | Carlson |
| 6,700,902 B1 | 3/2004 | Meyer |
| 6,701,345 B1 | 3/2004 | Carley et al. |
| 6,701,514 B1 | 3/2004 | Haswell et al. |
| 6,704,873 B1 | 3/2004 | Underwood |
| 6,715,037 B2 | 3/2004 | Malcolm |
| 6,715,145 B1 | 3/2004 | Bowman-Amuah |
| 6,718,535 B1 | 4/2004 | Underwood |
| 6,721,713 B1 | 4/2004 | Guheen et al. |
| 6,728,787 B1 | 4/2004 | Leigh |
| 6,732,237 B1 | 5/2004 | Jacobs et al. |
| 6,732,269 B1 | 5/2004 | Baskey et al. |
| 6,732,314 B1 | 5/2004 | Borella et al. |
| 6,735,601 B1 | 5/2004 | Subrahmanyam |
| 6,735,691 B1 | 5/2004 | Capps et al. |
| 6,742,015 B1 | 5/2004 | Bowman-Amuah |
| 6,744,774 B2 | 6/2004 | Sharma |
| 6,754,699 B2 | 6/2004 | Swildens et al. |
| 6,760,748 B1 | 7/2004 | Hakim |
| 6,766,373 B1 | 7/2004 | Beadle et al. |
| 6,772,203 B1 | 8/2004 | Feiertag et al. |
| 6,775,392 B1 | 8/2004 | Rhoads |
| 6,785,719 B1 | 8/2004 | Jacobson et al. |
| 6,788,315 B1 | 9/2004 | Kekic et al. |
| 6,789,170 B1 | 9/2004 | Jacobs et al. |
| 6,792,615 B1 | 9/2004 | Rowe et al. |
| 6,801,927 B1 | 10/2004 | Smith et al. |
| 6,802,020 B1 | 10/2004 | Smith |
| 6,807,607 B1 | 10/2004 | Lamparter |
| 6,820,125 B1 | 11/2004 | Dias et al. |
| 6,820,133 B1 | 11/2004 | Grove et al. |
| 6,820,974 B2 | 11/2004 | Silverbrook |
| 6,823,374 B2 | 11/2004 | Kausik et al. |
| 6,826,626 B1 | 11/2004 | McManus |
| 6,826,627 B2 | 11/2004 | Sjollema et al. |
| 6,831,898 B1 | 12/2004 | Edsall et al. |
| 6,842,906 B1 | 1/2005 | Bowman-Amuah |
| 6,847,892 B2 | 1/2005 | Zhou et al. |
| 6,850,252 B1 | 2/2005 | Hoffberg |
| 6,870,921 B1 | 3/2005 | Elsey et al. |
| 6,873,988 B2 | 3/2005 | Herrmann et al. |
| 6,880,086 B2 | 4/2005 | Kidder et al. |
| 6,883,068 B2 | 4/2005 | Tsirigotis et al. |
| 6,888,927 B1 | 5/2005 | Cruickshank et al. |
| 6,894,981 B1 | 5/2005 | Coile et al. |
| 6,899,420 B2 | 5/2005 | Silverbrook |
| 6,901,072 B1 | 5/2005 | Wong |
| 6,904,449 B1 | 6/2005 | Quinones |
| 6,904,519 B2 | 6/2005 | Anand et al. |
| 6,907,546 B1 | 6/2005 | Haswell et al. |
| 6,910,074 B1 | 6/2005 | Amin et al. |
| 6,912,522 B2 | 6/2005 | Edgar |
| 6,918,113 B2 | 7/2005 | Patel et al. |
| 6,918,665 B2 | 7/2005 | Silverbrook |
| 6,920,502 B2 | 7/2005 | Araujo et al. |
| 6,925,495 B2 | 8/2005 | Hegde et al. |
| 6,934,288 B2 | 8/2005 | Dempo |
| 6,935,736 B2 | 8/2005 | Silverbrook |
| 6,944,279 B2 | 9/2005 | Elsey et al. |
| 6,954,736 B2 | 10/2005 | Menninger et al. |
| 6,954,877 B2 | 10/2005 | Earl et al. |
| 6,957,186 B1 | 10/2005 | Guheen et al. |
| 6,957,249 B2 | 10/2005 | Salo et al. |
| 6,959,320 B2 | 10/2005 | Shah et al. |
| 6,974,928 B2 | 12/2005 | Bloom |
| 6,976,090 B2 | 12/2005 | Ben-Shaul et al. |
| 6,980,962 B1 | 12/2005 | Arganbright et al. |
| 6,990,070 B1 | 1/2006 | Aweya et al. |
| 6,990,480 B1 | 1/2006 | Burt |
| 6,993,016 B1 | 1/2006 | Liva et al. |
| 6,996,628 B2 | 2/2006 | Keane et al. |
| 6,996,631 B1 | 2/2006 | Aiken et al. |
| 7,000,012 B2 | 2/2006 | Moore et al. |
| 7,007,092 B2 | 2/2006 | Peiffer |
| 7,007,103 B2 | 2/2006 | Pinkerton et al. |
| 7,010,300 B1 | 3/2006 | Jones et al. |
| 7,013,290 B2 | 3/2006 | Ananian |
| 7,016,055 B2 | 3/2006 | Dodge et al. |
| 7,020,719 B1 | 3/2006 | Grove et al. |
| 7,023,979 B1 | 4/2006 | Wu et al. |
| 7,024,452 B1 | 4/2006 | O'Connell et al. |
| 7,026,954 B2 | 4/2006 | Slemmer et al. |
| 7,027,055 B2 | 4/2006 | Anderson et al. |
| 7,028,083 B2 | 4/2006 | Levine et al. |
| 7,028,333 B2 | 4/2006 | Tuomenoksa et al. |
| 7,028,334 B2 | 4/2006 | Tuomenoksa |
| 7,031,314 B2 | 4/2006 | Craig et al. |
| 7,034,691 B1 | 4/2006 | Rapaport et al. |

(56) References Cited

U.S. PATENT DOCUMENTS

| | | | |
|---|---|---|---|
| 7,035,427 B2 | 4/2006 | Rhoads | |
| 7,036,142 B1 | 4/2006 | Zhang et al. | |
| 7,039,606 B2 | 5/2006 | Hoffman et al. | |
| 7,039,708 B1 | 5/2006 | Knobl et al. | |
| 7,042,879 B2 | 5/2006 | Eschbach et al. | |
| 7,043,529 B1 | 5/2006 | Simonoff | |
| 7,047,279 B1 | 5/2006 | Beams et al. | |
| 7,047,424 B2 | 5/2006 | Bendinelli et al. | |
| 7,051,161 B2 | 5/2006 | Dixit et al. | |
| 7,051,316 B2 | 5/2006 | Charisius et al. | |
| 7,054,837 B2 | 5/2006 | Hoffman et al. | |
| 7,054,944 B2 | 5/2006 | Tang et al. | |
| 7,055,028 B2 | 5/2006 | Peiffer et al. | |
| 7,055,169 B2 | 5/2006 | Delpuch et al. | |
| 7,055,947 B2 | 6/2006 | Silverbrook | |
| 7,057,759 B2 | 6/2006 | Lapstun et al. | |
| 7,069,234 B1 | 6/2006 | Cornelius et al. | |
| 7,070,110 B2 | 7/2006 | Lapstun et al. | |
| 7,072,665 B1 | 7/2006 | Blumberg et al. | |
| 7,072,843 B2 | 7/2006 | Menninger et al. | |
| 7,072,965 B2 | 7/2006 | Ryuutou et al. | |
| 7,080,041 B2 | 7/2006 | Nagel | |
| 7,082,409 B1 | 7/2006 | Cherry | |
| 7,085,683 B2 | 8/2006 | Anderson et al. | |
| 7,085,834 B2 | 8/2006 | Delany et al. | |
| 7,085,854 B2 | 8/2006 | Keane et al. | |
| 7,086,728 B2 | 8/2006 | Silverbrook | |
| 7,092,370 B2 | 8/2006 | Jiang et al. | |
| 7,096,009 B2 | 8/2006 | Mousseau et al. | |
| 7,096,418 B1 | 8/2006 | Singhal et al. | |
| 7,096,495 B1 | 8/2006 | Warrier et al. | |
| 7,097,106 B2 | 8/2006 | Silverbrook et al. | |
| 7,100,195 B1 | 8/2006 | Underwood | |
| 7,103,068 B1 | 9/2006 | Gardner et al. | |
| 7,107,285 B2 | 9/2006 | Von Kaenel et al. | |
| 7,113,779 B1 | 9/2006 | Fujisaki | |
| 7,113,962 B1 | 9/2006 | Kee et al. | |
| 7,114,180 B1 | 9/2006 | DeCaprio | |
| 7,117,504 B2 | 10/2006 | Smith et al. | |
| 7,117,530 B1 | 10/2006 | Lin | |
| 7,120,596 B2 | 10/2006 | Hoffman et al. | |
| 7,120,666 B2 | 10/2006 | McCanne et al. | |
| 7,120,690 B1 | 10/2006 | Krishnan et al. | |
| 7,120,852 B2 | 10/2006 | Terry et al. | |
| 7,124,101 B1 | 10/2006 | Mikurak | |
| 7,124,442 B2 | 10/2006 | Nash-Putnam | |
| 7,126,955 B2 | 10/2006 | Nabhan et al. | |
| 7,128,265 B2 | 10/2006 | Silverbrook et al. | |
| 7,128,270 B2 | 10/2006 | Silverbrook et al. | |
| 7,130,792 B2 | 10/2006 | Tokieda et al. | |
| 7,130,807 B1 | 10/2006 | Mikurak | |
| 7,131,596 B2 | 11/2006 | Lapstun et al. | |
| 7,134,131 B1 | 11/2006 | Hendricks et al. | |
| 7,135,991 B2 | 11/2006 | Slemmer et al. | |
| 7,136,645 B2 | 11/2006 | Hanson et al. | |
| 7,137,566 B2 | 11/2006 | Silverbrook et al. | |
| 7,139,999 B2 | 11/2006 | Bowman-Amuah | |
| 7,140,044 B2 | 11/2006 | Redlich et al. | |
| 7,143,153 B1 | 11/2006 | Black et al. | |
| 7,144,095 B2 | 12/2006 | Silverbrook | |
| 7,146,384 B2 | 12/2006 | Sawafta | |
| 7,146,644 B2 | 12/2006 | Redlich et al. | |
| 7,149,698 B2 | 12/2006 | Guheen et al. | |
| 7,149,897 B2 | 12/2006 | Chincheck et al. | |
| 7,149,959 B1 | 12/2006 | Jones et al. | |
| 7,150,398 B2 | 12/2006 | Silverbrook et al. | |
| 7,152,047 B1 | 12/2006 | Nagel | |
| 7,152,092 B2 | 12/2006 | Beams et al. | |
| 7,152,207 B1 | 12/2006 | Underwood et al. | |
| 7,155,518 B2 | 12/2006 | Forslow | |
| 7,155,676 B2 | 12/2006 | Land et al. | |
| 7,159,014 B2 | 1/2007 | Kausik et al. | |
| 7,159,777 B2 | 1/2007 | Silverbrook et al. | |
| 7,162,540 B2 | 1/2007 | Jasen et al. | |
| 7,164,680 B2 | 1/2007 | Loguinov | |
| 7,165,041 B1 | 1/2007 | Guheen et al. | |
| 7,167,844 B1 | 1/2007 | Leong et al. | |
| 7,171,379 B2 | 1/2007 | Menninger et al. | |
| 7,175,089 B2 | 2/2007 | Silverbrook et al. | |
| 7,178,106 B2 | 2/2007 | Lamkin et al. | |
| 7,178,719 B2 | 2/2007 | Silverbrook et al. | |
| 7,181,766 B2 | 2/2007 | Bendinelli et al. | |
| 7,184,445 B2 | 2/2007 | Gupta et al. | |
| 7,187,470 B2 | 3/2007 | Lapstun et al. | |
| 7,188,273 B2 | 3/2007 | Allen et al. | |
| 7,188,769 B2 | 3/2007 | Silverbrook et al. | |
| 7,191,252 B2 | 3/2007 | Redlich et al. | |
| 7,194,761 B1 | 3/2007 | Champagne | |
| 7,197,374 B2 | 3/2007 | Silverbrook et al. | |
| 7,197,502 B2 | 3/2007 | Feinsmith | |
| 7,197,570 B2 | 3/2007 | Eylon et al. | |
| 7,197,602 B2 | 3/2007 | Malcolm | |
| 7,197,751 B2 | 3/2007 | Fedotov et al. | |
| 7,199,885 B2 | 4/2007 | Dodge | |
| 7,200,804 B1 | 4/2007 | Khavari et al. | |
| 7,206,811 B2 | 4/2007 | Skurikhin et al. | |
| 7,207,483 B2 | 4/2007 | Silverbrook et al. | |
| 7,207,485 B2 | 4/2007 | Silverbrook et al. | |
| 7,212,296 B2 | 5/2007 | Dodge et al. | |
| 7,216,173 B2 * | 5/2007 | Clayton et al. | 709/227 |
| 7,219,127 B2 | 5/2007 | Huck et al. | |
| 7,221,660 B1 | 5/2007 | Simonson et al. | |
| 7,222,152 B1 | 5/2007 | Thompson et al. | |
| 7,222,305 B2 | 5/2007 | Teplov et al. | |
| 7,225,040 B2 | 5/2007 | Eller et al. | |
| 7,225,244 B2 | 5/2007 | Reynolds et al. | |
| 7,225,382 B2 | 5/2007 | Ramech et al. | |
| 7,228,459 B2 | 6/2007 | Jiang et al. | |
| 7,246,233 B2 | 7/2007 | Brabson et al. | |
| 7,260,617 B2 | 8/2007 | Bazinet et al. | |
| 7,260,840 B2 | 8/2007 | Swander et al. | |
| 7,263,071 B2 | 8/2007 | Yim | |
| 7,272,853 B2 | 9/2007 | Goodman et al. | |
| 7,284,044 B2 | 10/2007 | Teraoaka et al. | |
| 7,318,100 B2 | 1/2008 | Demmer et al. | |
| 7,321,906 B2 | 1/2008 | Green | |
| 7,328,267 B1 | 2/2008 | Bashyam et al. | |
| 7,340,772 B2 | 3/2008 | Panasyuk et al. | |
| 7,353,533 B2 | 4/2008 | Wright et al. | |
| 7,363,347 B2 | 4/2008 | Thomas | |
| 7,363,378 B2 | 4/2008 | Holmes et al. | |
| 7,370,353 B2 | 5/2008 | Yang | |
| 7,386,631 B1 | 6/2008 | Sibal et al. | |
| 7,389,462 B1 | 6/2008 | Wang et al. | |
| 7,392,348 B2 | 6/2008 | Dumont | |
| 7,398,320 B1 | 7/2008 | Minakuchi et al. | |
| 7,398,552 B2 | 7/2008 | Pardee et al. | |
| 7,401,116 B1 | 7/2008 | Chalfin et al. | |
| 7,404,003 B1 | 7/2008 | Noble | |
| 7,406,533 B2 | 7/2008 | Li et al. | |
| 7,409,708 B2 | 8/2008 | Goodman et al. | |
| 7,415,723 B2 | 8/2008 | Pandya | |
| 7,420,992 B1 | 9/2008 | Fang et al. | |
| 7,433,314 B2 | 10/2008 | Sharma et al. | |
| 7,441,119 B2 | 10/2008 | Brabson et al. | |
| 7,458,095 B2 | 11/2008 | Forsberg | |
| 7,464,264 B2 | 12/2008 | Goodman et al. | |
| 7,480,312 B2 | 1/2009 | Ossman | |
| 7,496,659 B1 | 2/2009 | Coverdill et al. | |
| 7,505,455 B1 | 3/2009 | Goodwin et al. | |
| 7,512,702 B1 | 3/2009 | Srivastava et al. | |
| 7,522,581 B2 | 4/2009 | Acharya et al. | |
| 7,533,409 B2 | 5/2009 | Keane et al. | |
| 7,536,715 B2 | 5/2009 | Markham | |
| 7,577,144 B2 | 8/2009 | Chang et al. | |
| 7,606,902 B2 | 10/2009 | Rao et al. | |
| 7,609,721 B2 | 10/2009 | Rao et al. | |
| 7,644,188 B2 | 1/2010 | Vlodavsky et al. | |
| 7,673,048 B1 | 3/2010 | O'Toole et al. | |
| 7,757,074 B2 | 7/2010 | Sundarrajan et al. | |
| 7,775,074 B1 * | 8/2010 | Tobias et al. | 70/493 |
| 7,882,247 B2 | 2/2011 | Sturniolo et al. | |
| 7,921,184 B2 | 4/2011 | Sundarrajan et al. | |
| 7,945,678 B1 | 5/2011 | Skene | |

(56) References Cited

U.S. PATENT DOCUMENTS

| | | |
|---|---|---|
| 7,979,528 B2 | 7/2011 | Eisenberg et al. |
| 7,979,694 B2 | 7/2011 | Touitou et al. |
| 8,005,981 B2 | 8/2011 | Tuck et al. |
| 8,205,000 B2 | 6/2012 | Chang et al. |
| 8,223,647 B2 | 7/2012 | Kakani et al. |
| 8,261,057 B2 * | 9/2012 | Sundarrajan et al. ......... 713/151 |
| 8,351,327 B1 * | 1/2013 | Binns ......................... 370/229 |
| 8,495,305 B2 | 7/2013 | Sundarrajan et al. |
| 2001/0030970 A1 | 10/2001 | Wiryaman et al. |
| 2001/0037387 A1 | 11/2001 | Gilde et al. |
| 2001/0043600 A1 | 11/2001 | Chatterjee et al. |
| 2001/0046212 A1 | 11/2001 | Nakajima |
| 2001/0047406 A1 | 11/2001 | Araujo et al. |
| 2001/0049717 A1 | 12/2001 | Freeman et al. |
| 2001/0049741 A1 | 12/2001 | Skene et al. |
| 2001/0052016 A1 | 12/2001 | Skene et al. |
| 2001/0052065 A1 | 12/2001 | Alexander, III et al. |
| 2002/0004834 A1 | 1/2002 | Guenther et al. |
| 2002/0004902 A1 | 1/2002 | Toh et al. |
| 2002/0007402 A1 | 1/2002 | Thomas Huston et al. |
| 2002/0007404 A1 | 1/2002 | Vange et al. |
| 2002/0016827 A1 | 2/2002 | McCabe et al. |
| 2002/0023210 A1 | 2/2002 | Tuomenoksa et al. |
| 2002/0026478 A1 | 2/2002 | Rodgers et al. |
| 2002/0026531 A1 | 2/2002 | Keane et al. |
| 2002/0029285 A1 | 3/2002 | Collins |
| 2002/0032725 A1 | 3/2002 | Araujo et al. |
| 2002/0032798 A1 | 3/2002 | Xu |
| 2002/0035451 A1 | 3/2002 | Rothermel |
| 2002/0035596 A1 | 3/2002 | Yang et al. |
| 2002/0038339 A1 | 3/2002 | Xu |
| 2002/0042875 A1 | 4/2002 | Shukla |
| 2002/0049608 A1 | 4/2002 | Hartsell et al. |
| 2002/0049841 A1 | 4/2002 | Johnson et al. |
| 2002/0055966 A1 | 5/2002 | Border et al. |
| 2002/0057717 A1 | 5/2002 | Mallory |
| 2002/0059274 A1 | 5/2002 | Hartsell et al. |
| 2002/0059429 A1 | 5/2002 | Carpenter et al. |
| 2002/0059435 A1 | 5/2002 | Border et al. |
| 2002/0065864 A1 | 5/2002 | Hartsell et al. |
| 2002/0065919 A1 | 5/2002 | Taylor et al. |
| 2002/0069278 A1 | 6/2002 | Forslow |
| 2002/0071438 A1 | 6/2002 | Singh |
| 2002/0073061 A1 | 6/2002 | Collins |
| 2002/0073298 A1 | 6/2002 | Geiger et al. |
| 2002/0081971 A1 | 6/2002 | Travostino |
| 2002/0083175 A1 | 6/2002 | Afek et al. |
| 2002/0083183 A1 | 6/2002 | Pujare et al. |
| 2002/0087729 A1 | 7/2002 | Edgar |
| 2002/0091788 A1 | 7/2002 | Chlan et al. |
| 2002/0095400 A1 | 7/2002 | Johnson et al. |
| 2002/0095498 A1 | 7/2002 | Chanda et al. |
| 2002/0098840 A1 | 7/2002 | Hanson et al. |
| 2002/0099940 A1 | 7/2002 | Wang |
| 2002/0101848 A1 | 8/2002 | Lee et al. |
| 2002/0101860 A1 | 8/2002 | Thornton et al. |
| 2002/0105972 A1 | 8/2002 | Richter et al. |
| 2002/0107903 A1 | 8/2002 | Richter et al. |
| 2002/0107962 A1 | 8/2002 | Richter et al. |
| 2002/0107971 A1 | 8/2002 | Bailey et al. |
| 2002/0107989 A1 | 8/2002 | Johnson et al. |
| 2002/0107990 A1 | 8/2002 | Johnson et al. |
| 2002/0108059 A1 | 8/2002 | Canion et al. |
| 2002/0116452 A1 | 8/2002 | Johnson et al. |
| 2002/0116582 A1 | 8/2002 | Copeland et al. |
| 2002/0120743 A1 | 8/2002 | Shabtay et al. |
| 2002/0126675 A1 | 9/2002 | Yoshimura et al. |
| 2002/0133593 A1 | 9/2002 | Johnson et al. |
| 2002/0138511 A1 | 9/2002 | Psounis et al. |
| 2002/0138572 A1 | 9/2002 | Delany et al. |
| 2002/0138618 A1 | 9/2002 | Szabo |
| 2002/0138640 A1 | 9/2002 | Raz et al. |
| 2002/0147795 A1 | 10/2002 | Cantwell |
| 2002/0147822 A1 | 10/2002 | Susai et al. |
| 2002/0150064 A1 | 10/2002 | Lucidarme |
| 2002/0152373 A1 | 10/2002 | Sun et al. |
| 2002/0152423 A1 | 10/2002 | McCabe |
| 2002/0156927 A1 | 10/2002 | Boucher et al. |
| 2002/0161908 A1 | 10/2002 | Benitez et al. |
| 2002/0163882 A1 | 11/2002 | Bornstein et al. |
| 2002/0174227 A1 | 11/2002 | Hartsell et al. |
| 2002/0174255 A1 | 11/2002 | Hayter et al. |
| 2002/0176532 A1 | 11/2002 | McClelland et al. |
| 2002/0184224 A1 | 12/2002 | Haff et al. |
| 2002/0194382 A1 | 12/2002 | Kausik et al. |
| 2002/0196279 A1 | 12/2002 | Bloomfield et al. |
| 2002/0199007 A1 | 12/2002 | Clayton et al. |
| 2003/0009538 A1 | 1/2003 | Shah et al. |
| 2003/0014623 A1 | 1/2003 | Freed et al. |
| 2003/0014624 A1 | 1/2003 | Maturana et al. |
| 2003/0014625 A1 | 1/2003 | Freed et al. |
| 2003/0014628 A1 | 1/2003 | Freed et al. |
| 2003/0014650 A1 | 1/2003 | Freed et al. |
| 2003/0018891 A1 | 1/2003 | Hall et al. |
| 2003/0023767 A1 | 1/2003 | Brabson et al. |
| 2003/0026241 A1 | 2/2003 | Ono et al. |
| 2003/0033520 A1 | 2/2003 | Peiffer et al. |
| 2003/0037108 A1 | 2/2003 | Peiffer et al. |
| 2003/0039354 A1 | 2/2003 | Kimble et al. |
| 2003/0046586 A1 | 3/2003 | Bheemarasetti et al. |
| 2003/0046587 A1 | 3/2003 | Bheemarasetti et al. |
| 2003/0051100 A1 | 3/2003 | Patel |
| 2003/0051102 A1 | 3/2003 | Jacobs et al. |
| 2003/0055883 A1 | 3/2003 | Wiles, Jr. |
| 2003/0055962 A1 | 3/2003 | Freund et al. |
| 2003/0061505 A1 | 3/2003 | Sperry et al. |
| 2003/0065763 A1 | 4/2003 | Swildens et al. |
| 2003/0067874 A1 | 4/2003 | See et al. |
| 2003/0069941 A1 | 4/2003 | Peiffer |
| 2003/0079031 A1 | 4/2003 | Nagano |
| 2003/0084162 A1 | 5/2003 | Johnson et al. |
| 2003/0084165 A1 | 5/2003 | Kjellberg et al. |
| 2003/0088698 A1 | 5/2003 | Singh et al. |
| 2003/0088788 A1 | 5/2003 | Yang |
| 2003/0093566 A1 | 5/2003 | Jardin |
| 2003/0105604 A1 | 6/2003 | Ash et al. |
| 2003/0105977 A1 | 6/2003 | Brabson et al. |
| 2003/0110296 A1 | 6/2003 | Kirsch et al. |
| 2003/0110379 A1 | 6/2003 | Ylonen et al. |
| 2003/0112809 A1 | 6/2003 | Bharali et al. |
| 2003/0112823 A1 | 6/2003 | Collins et al. |
| 2003/0115421 A1 | 6/2003 | McHenry et al. |
| 2003/0123394 A1 | 7/2003 | Neale et al. |
| 2003/0123481 A1 | 7/2003 | Neale et al. |
| 2003/0131079 A1 | 7/2003 | Neale et al. |
| 2003/0131263 A1 | 7/2003 | Keane et al. |
| 2003/0140121 A1 | 7/2003 | Adams |
| 2003/0149899 A1 | 8/2003 | Boden et al. |
| 2003/0152028 A1 | 8/2003 | Raisanen et al. |
| 2003/0154110 A1 | 8/2003 | Walter et al. |
| 2003/0154239 A1 | 8/2003 | Davis et al. |
| 2003/0165138 A1 | 9/2003 | Swonk et al. |
| 2003/0167403 A1 | 9/2003 | McCurley et al. |
| 2003/0174718 A1 | 9/2003 | Sampath et al. |
| 2003/0177389 A1 | 9/2003 | Albert et al. |
| 2003/0177395 A1 | 9/2003 | Pardee et al. |
| 2003/0182423 A1 | 9/2003 | Shafir et al. |
| 2003/0182431 A1 | 9/2003 | Sturniolo et al. |
| 2003/0182437 A1 | 9/2003 | Kobayashi et al. |
| 2003/0188001 A1 | 10/2003 | Eisenberg et al. |
| 2003/0191799 A1 | 10/2003 | Araujo et al. |
| 2003/0191812 A1 | 10/2003 | Agarwalla et al. |
| 2003/0198189 A1 | 10/2003 | Roberts et al. |
| 2003/0200295 A1 | 10/2003 | Roberts et al. |
| 2003/0200353 A1 | 10/2003 | Dogra et al. |
| 2003/0208602 A1 | 11/2003 | Bhalla et al. |
| 2003/0212760 A1 | 11/2003 | Chen et al. |
| 2003/0212776 A1 | 11/2003 | Roberts et al. |
| 2003/0217105 A1 | 11/2003 | Zircher et al. |
| 2003/0217126 A1 | 11/2003 | Polcha et al. |
| 2003/0217149 A1 | 11/2003 | Crichton et al. |
| 2003/0223361 A1 | 12/2003 | Hussain et al. |
| 2003/0223418 A1 | 12/2003 | Desai et al. |
| 2003/0223433 A1 | 12/2003 | Lee et al. |

(56) References Cited

U.S. PATENT DOCUMENTS

| | | |
|---|---|---|
| 2003/0226018 A1 | 12/2003 | Tardo et al. |
| 2003/0229718 A1 | 12/2003 | Tock et al. |
| 2003/0229761 A1 | 12/2003 | Basu et al. |
| 2003/0233423 A1 | 12/2003 | Dilley et al. |
| 2003/0236831 A1 | 12/2003 | Ortiz et al. |
| 2003/0236837 A1 | 12/2003 | Johnson et al. |
| 2003/0236861 A1 | 12/2003 | Johnson et al. |
| 2003/0236919 A1 | 12/2003 | Johnson et al. |
| 2004/0003101 A1 | 1/2004 | Roth et al. |
| 2004/0003137 A1 | 1/2004 | Callender et al. |
| 2004/0006708 A1 | 1/2004 | Mukherjee et al. |
| 2004/0008693 A1 | 1/2004 | Grove et al. |
| 2004/0010601 A1 | 1/2004 | Afergan et al. |
| 2004/0010604 A1 | 1/2004 | Tanaka et al. |
| 2004/0010621 A1 | 1/2004 | Afergan et al. |
| 2004/0031058 A1 | 2/2004 | Reisman |
| 2004/0034744 A1 | 2/2004 | Karlsson et al. |
| 2004/0034794 A1 | 2/2004 | Mayer et al. |
| 2004/0039827 A1 | 2/2004 | Thomas et al. |
| 2004/0042487 A1 | 3/2004 | Ossman |
| 2004/0044521 A1 | 3/2004 | Chen et al. |
| 2004/0044731 A1 | 3/2004 | Chen et al. |
| 2004/0049515 A1 | 3/2004 | Haff et al. |
| 2004/0073716 A1 | 4/2004 | Boom et al. |
| 2004/0078621 A1 | 4/2004 | Talaugon et al. |
| 2004/0078772 A1 | 4/2004 | Balay et al. |
| 2004/0087304 A1 | 5/2004 | Buddhikot et al. |
| 2004/0098486 A1 | 5/2004 | Gu et al. |
| 2004/0100976 A1 | 5/2004 | Chang et al. |
| 2004/0103150 A1 | 5/2004 | Ogdon et al. |
| 2004/0103225 A1 | 5/2004 | McAlpine et al. |
| 2004/0103438 A1 | 5/2004 | Yan et al. |
| 2004/0107360 A1 | 6/2004 | Herrmann et al. |
| 2004/0111519 A1 | 6/2004 | Fu et al. |
| 2004/0128252 A1 | 7/2004 | Shirai et al. |
| 2004/0128346 A1 | 7/2004 | Melamed et al. |
| 2004/0141525 A1 | 7/2004 | Bhushan et al. |
| 2004/0143655 A1 | 7/2004 | Narad et al. |
| 2004/0143734 A1 | 7/2004 | Buer et al. |
| 2004/0146053 A1 | 7/2004 | Nabhan et al. |
| 2004/0162876 A1 | 8/2004 | Kohavi |
| 2004/0177158 A1 | 9/2004 | Bauch et al. |
| 2004/0177359 A1 | 9/2004 | Bauch et al. |
| 2004/0190092 A1 | 9/2004 | Silverbrook et al. |
| 2004/0202171 A1 | 10/2004 | Hama |
| 2004/0203296 A1 | 10/2004 | Moreton et al. |
| 2004/0205439 A1 | 10/2004 | Carmeli et al. |
| 2004/0210320 A1 | 10/2004 | Pandya |
| 2004/0213248 A1 | 10/2004 | Okuda et al. |
| 2004/0215665 A1 | 10/2004 | Edgar et al. |
| 2004/0215746 A1 | 10/2004 | McCanne et al. |
| 2004/0221031 A1 | 11/2004 | Desai |
| 2004/0225898 A1 | 11/2004 | Frost et al. |
| 2004/0225911 A1 | 11/2004 | Smith |
| 2004/0246971 A1 | 12/2004 | Banerjee et al. |
| 2004/0249911 A1 | 12/2004 | Alkhatib et al. |
| 2004/0249975 A1 | 12/2004 | Tuck et al. |
| 2004/0258003 A1 | 12/2004 | Kokot et al. |
| 2004/0260922 A1 | 12/2004 | Goodman et al. |
| 2004/0268175 A1 | 12/2004 | Koch et al. |
| 2004/0268357 A1 | 12/2004 | Joy et al. |
| 2004/0268358 A1 | 12/2004 | Darling et al. |
| 2005/0005014 A1 | 1/2005 | Holmes et al. |
| 2005/0005107 A1 | 1/2005 | Touboul |
| 2005/0013280 A1 | 1/2005 | Buddhikot et al. |
| 2005/0021762 A1 | 1/2005 | Gbadegesin |
| 2005/0022011 A1 | 1/2005 | Swander et al. |
| 2005/0022012 A1 | 1/2005 | Bluestone et al. |
| 2005/0022031 A1 | 1/2005 | Goodman et al. |
| 2005/0025150 A1 | 2/2005 | Helmy et al. |
| 2005/0027788 A1 | 2/2005 | Koopmans et al. |
| 2005/0031058 A1 | 2/2005 | Soong et al. |
| 2005/0033858 A1 | 2/2005 | Swildens et al. |
| 2005/0033926 A1 | 2/2005 | Dumont |
| 2005/0044350 A1 | 2/2005 | White et al. |
| 2005/0050317 A1 | 3/2005 | Kramer et al. |
| 2005/0055690 A1 | 3/2005 | Cornillon et al. |
| 2005/0058112 A1 | 3/2005 | Lahey et al. |
| 2005/0080850 A1 | 4/2005 | Salesky et al. |
| 2005/0080907 A1 | 4/2005 | Panasyuk et al. |
| 2005/0102529 A1 | 5/2005 | Buddhikot et al. |
| 2005/0108412 A1 | 5/2005 | Sjollema et al. |
| 2005/0108517 A1 | 5/2005 | Dillon et al. |
| 2005/0122980 A1 | 6/2005 | Anand et al. |
| 2005/0125663 A1 | 6/2005 | Funk |
| 2005/0132030 A1 | 6/2005 | Hopen et al. |
| 2005/0132060 A1 | 6/2005 | Mo et al. |
| 2005/0135250 A1 | 6/2005 | Singh et al. |
| 2005/0144186 A1 | 6/2005 | Hesselink et al. |
| 2005/0144481 A1 | 6/2005 | Hopen et al. |
| 2005/0147126 A1 | 7/2005 | Qiu et al. |
| 2005/0149481 A1 | 7/2005 | Hesselink et al. |
| 2005/0149726 A1 | 7/2005 | Joshi et al. |
| 2005/0165928 A1 | 7/2005 | Shu et al. |
| 2005/0177866 A1 | 8/2005 | Kirsch |
| 2005/0185647 A1 | 8/2005 | Rao et al. |
| 2005/0193075 A1 | 9/2005 | Haff et al. |
| 2005/0195780 A1 | 9/2005 | Haverinen et al. |
| 2005/0198380 A1 | 9/2005 | Panasyuk et al. |
| 2005/0198532 A1 | 9/2005 | Comlekoglu et al. |
| 2005/0210150 A1 | 9/2005 | Bahl |
| 2005/0223084 A1 | 10/2005 | Cheng |
| 2005/0223412 A1 | 10/2005 | Nadalin et al. |
| 2005/0232161 A1 | 10/2005 | Maufer et al. |
| 2005/0232298 A1 | 10/2005 | Beverly et al. |
| 2005/0246346 A1 | 11/2005 | Gerdes et al. |
| 2005/0246445 A1 | 11/2005 | Panasyuk et al. |
| 2005/0256923 A1 | 11/2005 | Adachi |
| 2005/0259634 A1 | 11/2005 | Ross |
| 2005/0262357 A1 | 11/2005 | Araujo et al. |
| 2005/0265315 A1 | 12/2005 | Edgar |
| 2005/0265353 A1 | 12/2005 | Sengupta et al. |
| 2005/0267974 A1 | 12/2005 | Panasyuk et al. |
| 2005/0286466 A1 | 12/2005 | Tagg et al. |
| 2006/0005240 A1 | 1/2006 | Sundarrajan et al. |
| 2006/0015570 A1 | 1/2006 | Khemani et al. |
| 2006/0018332 A1 | 1/2006 | Kakani et al. |
| 2006/0031547 A1 | 2/2006 | Tsui et al. |
| 2006/0034283 A1 | 2/2006 | Ko et al. |
| 2006/0041635 A1 | 2/2006 | Alexander et al. |
| 2006/0053164 A1 | 3/2006 | Ewing et al. |
| 2006/0053253 A1 | 3/2006 | Roth et al. |
| 2006/0059370 A1 | 3/2006 | Asnis et al. |
| 2006/0064500 A1 | 3/2006 | Roth et al. |
| 2006/0069719 A1 | 3/2006 | McCanne et al. |
| 2006/0080441 A1 | 4/2006 | Chen et al. |
| 2006/0089996 A1 | 4/2006 | Peiffer |
| 2006/0112185 A1 | 5/2006 | Van Bemmel |
| 2006/0123477 A1 | 6/2006 | Raghavan et al. |
| 2006/0129689 A1 | 6/2006 | Ho et al. |
| 2006/0133405 A1 | 6/2006 | Fee |
| 2006/0142878 A1 | 6/2006 | Banik et al. |
| 2006/0185010 A1 | 8/2006 | Sultan |
| 2006/0225130 A1 | 10/2006 | Chen et al. |
| 2006/0245414 A1 | 11/2006 | Susai et al. |
| 2006/0271652 A1 | 11/2006 | Stavrakos et al. |
| 2006/0274828 A1 | 12/2006 | Siemens et al. |
| 2007/0008883 A1 | 1/2007 | Kobayashi |
| 2007/0061067 A1 | 3/2007 | Zeinstra et al. |
| 2007/0067366 A1 | 3/2007 | Landis |
| 2007/0110046 A1 | 5/2007 | Farrell et al. |
| 2007/0130324 A1 | 6/2007 | Wang |
| 2007/0130334 A1 | 6/2007 | Carley |
| 2007/0156852 A1 | 7/2007 | Sundarrajan et al. |
| 2007/0169179 A1 | 7/2007 | Narad |
| 2007/0179955 A1 | 8/2007 | Croft et al. |
| 2007/0192827 A1 | 8/2007 | Maxted et al. |
| 2007/0206621 A1 | 9/2007 | Plamondon et al. |
| 2007/0233910 A1 | 10/2007 | Paley et al. |
| 2007/0245409 A1 | 10/2007 | Harris et al. |
| 2008/0034416 A1 | 2/2008 | Kumar et al. |
| 2008/0046616 A1 | 2/2008 | Verzunov et al. |
| 2008/0049786 A1 | 2/2008 | Ram et al. |
| 2008/0071915 A1 | 3/2008 | Gbadegesin |

(56) References Cited

U.S. PATENT DOCUMENTS

| | | |
|---|---|---|
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2008/0320151 A1 | 12/2008 | McCanne et al. |
| 2009/0133015 A1 | 5/2009 | Nagashima |
| 2010/0241846 A1 | 9/2010 | Sundarrajan et al. |

FOREIGN PATENT DOCUMENTS

| | | |
|---|---|---|
| EP | 0 436 365 | 7/1991 |
| EP | 0 618 708 A2 | 10/1994 |
| EP | 0 838 930 A2 | 4/1998 |
| EP | 1 045 553 | 10/2000 |
| EP | 1 134 942 | 9/2001 |
| EP | 1 427 133 | 6/2004 |
| EP | 1 432 209 | 6/2004 |
| JP | 07-302237 A | 11/1995 |
| JP | 08-006910 A | 1/1996 |
| JP | 10-178450 | 6/1998 |
| JP | 2002-532784 | 2/2002 |
| JP | 2002-084289 | 3/2002 |
| JP | 2004-078783 | 3/2004 |
| WO | WO-99/04343 | 1/1999 |
| WO | WO-00/34885 | 6/2000 |
| WO | WO-01/47185 A2 | 6/2001 |
| WO | WO-02/13037 | 2/2002 |
| WO | WO-02/23362 A1 | 3/2002 |
| WO | WO-02/39301 A2 | 5/2002 |
| WO | WO-02/069604 A2 | 9/2002 |
| WO | WO-03/019876 | 3/2003 |
| WO | WO-03/026244 | 3/2003 |
| WO | WO-03/048936 A1 | 6/2003 |
| WO | WO-03/083692 | 10/2003 |
| WO | WO-03/083692 A1 | 10/2003 |
| WO | WO-2004/088933 | 10/2004 |
| WO | WO-2004/114529 A2 | 12/2004 |
| WO | WO-2005/013534 | 2/2005 |
| WO | WO-2005/024567 A2 | 3/2005 |
| WO | WO-2005/048106 | 5/2005 |
| WO | WO-2005/088476 | 9/2005 |
| WO | WO-2006/005078 | 1/2006 |
| WO | WO-2006/012612 | 2/2006 |
| WO | WO-2006/020823 | 2/2006 |
| WO | WO-2006/074072 A3 | 7/2006 |
| WO | WO-2006/075219 A2 | 7/2006 |
| WO | WO-2008/112691 A2 | 9/2008 |
| WO | WO-2008/112698 A2 | 9/2008 |

OTHER PUBLICATIONS

Advisory Action for U.S. Appl. No. 11/187,508 dated Nov. 23, 2010.
Advisory Action for U.S. Appl. No. 11/187,512 dated Mar. 16, 2011.
Advisory Action for U.S. Appl. No. 11/161,093 dated Nov. 16, 2009.
Advisory Action for U.S. Appl. No. 11/161,093 dated Dec. 14, 2009.
Advisory Action for U.S. Appl. No. 11/039,946 dated Mar. 24, 2009.
Advisory Action for U.S. Appl. No. 11/161,091 dated May 6, 2009.
Advisory Action for U.S. Appl. No. 11/161,092 dated Apr. 24, 2009.
Biagioni et al., Signature for a network Protocol Stack: A System Application of Standard ML, Jul. 1994.
Canadian Office Action for CA appl. 2545496 dated Feb. 15, 2011.
Chinese Office Action on 200580028535.9 dated Dec. 13, 2011.
Chinese Office Action on 201110076025.6 dated Oct. 26, 2011.
Dictionary service [online], [retrieved on Jul. 23, 2009]. Retrieved from the Internet <URL: http://dictionary.reference.com/browse/discard>.
Doug Allen, Layer-7 Load Balancers Pack New Punch, CMP Media LLC Network Magazine, Sep. 2003.
EP Communication for EP Patent Application No. 07007414.1 dated Jun. 5, 2008. (6 pages).
EP Communication for European Patent Application No. 05776653.7 dated Oct. 5, 2007. (7 pages).
EP Communication from EP Patent Application No. 05 785 297.2, dated May 18, 2007, 2 pages.
EP Search Report for EP appl. 10184310.0 dated Dec. 9, 2010.
EP Search Report for EP appl. 10184317.5 dated Dec. 7, 2010.
EP Summons to Oral Proceedings for EP appl. 05776653.7 dated Jan. 14, 2011.
European Communication on 05776653.7 dated Jun. 24, 2011.
European Communication on 05855922.0 dated Nov. 24, 2011.
European Exam Report on 07007414.1 dated Aug. 11, 2011.
European Exam Report on 10184310.0 dated Aug. 11, 2011.
European Examination Report on 05774886.5 dated Nov. 24, 2011.
European Examination Report on 05855924.6 dated Nov. 24, 2011.
European Search Report for European Patent Application No. EP 07007414 dated Jul. 16, 2007. (2 pages).
European Supplemental Search Report on 05763688.8 dated Dec. 1, 2011.
Exam report for EP appl. 05785297.2 dated Jun. 19, 2009.
Exam Report for EP appl. 070074141 dated Nov. 17, 2009.
Exam Report for EP appln 05776653.7 dated Apr. 20, 2009.
Hasegawa et al., "A Mechanism for TCP Performance Enhancement over Assymetrical Environment," Proceedings 8th IEEE ISCC'03, 1530-1346/03, 2003.
International Search Report for PCT/US2005/023914, mailing date May 7, 2007. 2 pages.
International Search Report for PCT/US2005/026300, Mailing date: Dec. 16, 2005. 3 pages.
International Search Report for PCT/US2005/028663, Mailing date: Nov. 16, 2005. 3 pages.
International Search Report for PCT/US2005/047433 dated Jul. 12, 2007.
International Search Report for PCT/US2007/066433. Mailing date Oct. 31, 2007, p. 1-4.
International Search Report to PCT/US04/37918, mailed on Apr. 27, 2008, 1 page.
International Search Report to PCT/US2005/026296, mailed on Jan. 31, 2006, 5 pgs.
Ipswitch Inc., WSFTP User's Guide, Chapter 8: Security, Jun. 25, 2003, 8 pages.
J. C. Mogul, "The Case for Persistent-Connection HTTP," 8282 Computer Communication Review 25, Oct. 1995.
Japanese Office Action for JP appl. 2007-519353 dated Jul. 16, 2010.
Japanese Office Action for JP appl. 2007-522843 dated Dec. 1, 2010.
Japanese Office Action on 2007-48001 dated Oct. 29, 2010.
Japanese Office Action on 2007-48003 dated Nov. 8, 2010.
Japanese Office Action on 2007-552147 dated Jun. 30, 2011.
Kong, et al; "Pseudo-serving: a user-responsible paradigm for internet access"; Apr. 7-11, 1997; SO Computer Networks and ISDN Systems; vol. 29; pp. 1053-1064.
Korean Office Action for KR appl. 2006-7009144 dated Jan. 14, 2011.
Krishnamurthy B.C. et al., "Key differences between HTTP/1.0 and HTTP/1.1," Computer Networks, Elsevier Science Publishers B.V., vol. 31, No. 11-16, pp. 1737-1751, May 1999.
Lazenka, M. "The Evolution of Software Distribution: Where Did We Come From and Where Are We Heading?", 2005, ACM, p. 179-183.
Non Final Office Action dated Jan. 24, 2008 pertaining to U.S. Appl. No. 10/988,004. 6 pages.
Non Final Office Action dated Jun. 10, 2008 pertaining to U.S. Appl. No. 11/187,562. 15 pages.
Non Final Office Action dated Oct. 28, 2008 pertaining to U.S. Appl. No. 11/161,656. 21 pages.
Non Final Office Action dated Jun. 26, 2008 pertaining to U.S. Appl. No. 11/188,279. 12 pages.
Non Final Office Action dated Aug. 15, 2008 pertaining to U.S. Appl. No. 11/161,090 25 pages.
Non Final Office Action dated Dec. 11, 2007 pertaining to U.S Appl. No. 10/683,881. 10 pages.
Noriaki Kobayashi, "Internet VPN", N+1 Network Guide, vol. 3, No. 9, Oct. 1, 2003, pp. 44-49. (9 pages) (English Abstract).
Notice of Acceptance for AU 2010214746 dated Nov. 2, 2010.
Notice of Acceptance for AU Appl. 2005266943 dated May 28, 2010. (3 pages).

(56) References Cited

OTHER PUBLICATIONS

Notice of Acceptance for AU Appl. 2005272779 dated May 26, 2010. (3 pages).
Notice of allowance dated Jun. 17, 2009 pertaining to U.S. Appl. No. 11/188,279.
Notice of Allowance dated Sep. 18, 2008. U.S. Appl. No. 10/988,004 5 pgs.
Notice of Allowance for U.S. Appl. No. 11/161,090 dated Mar. 4, 2011.
Notice of Allowance for U.S. Appl. No. 12/336,795 dated Mar. 2, 2011.
Notice of Allowance for U.S. Appl. No. 11/161,092 dated Jun. 11, 2009.
Notice of Allowance for U.S. Appl. No. 11/187,512 dated Jun. 23, 2011.
Notice of Allowance for U.S. Appl. No. 11/039,946 dated Mar. 5, 2010.
Notice of Allowance for U.S. Appl. No. 11/161,656 dated Sep. 18, 2009.
Notice of Allowance on U.S. Appl. No. 12/557,497 dated May 6, 2011.
Notice of Allowance on U.S. Appl. No. 12/560,154 dated May 2, 2011.
Notice of Reasons for Rejection, Japanese Application No. 2007-549641 dated May 17, 2011.
Office Action dated Oct. 15, 2010 pertaining to U.S. Appl. No. 11/161,090 (29 pages).
Office Action dated Aug. 3, 2008. U.S. Appl. No. 11/161,091.
Office Action dated Aug. 20, 2008, U.S. Appl. No. 11/161,092.
Office Action for AU appl. 2005266943 dated May 14, 2009.
Office Action for AU appl. 2005272779 dated Apr. 23, 2009.
Office Action for CN App. No. 200580048867.3 dated Sep. 26, 2010.
Office Action for CN App. No. 200580048867.3 dated Jan. 26, 2011.
Office Action for CN Appl. 20050034849X dated Aug. 3, 2010.
Office Action for CN Appl. 200580030928.3 dated Apr. 23, 2010.(5 pages).
Office Action for CN appl. 200580034849.X dated Sep. 25, 2009.
Office Action for CN appln 00480040249.X dated Jun. 19, 2009.
Office Action for CN appln 200580028535 dated Jan. 15, 2010.
Office Action for CN appln 200580034849X dated Apr. 7, 2010.
Office Action for CN Appln 200580048867.3 dated Mar. 11, 2011.
Office Action for IL Application No. 180402 dated Dec. 15, 2010.
Office Action for IL Application No. 180405 dated Jan. 2, 2011.
Office Action for IL Application No. 180891 dated Jan. 4, 2011.
Office Action for IL application No. 18169 dated Jan. 2, 2011.
Office Action for IN Appl. 1514KOLNP2006 dated Sep. 7, 2010 (3 pages).
Office Action for JP App. No. 2007-48001 dated Apr. 29, 2010.
Office Action for JP appl. 2006-539930 dated Feb. 18, 2010.
Office Action for JP Appl. 2007-519353 dated Jul. 12, 2010. (6 pages) (English Abstract).
Office Action for JP Appl. 2007-522841 dated Sep. 10, 2010. (9 pages) (English Abstract).
Office Action for JP Appl. 2007-525810 dated Aug. 4, 2010. (9 pages) (English Abstract).
Office Action for U.S. Appl. No. 11/161,093 dated Oct. 1, 2010. (10 pages).
Office Action for U.S. Appl. No. 11/187,512 dated Jun. 22, 2010. (20 pages).
Office Action for U.S. Appl. No. 11/188,274 dated Mar. 29, 2010. (15 pages).
Office Action for U.S. Appl. No. 11/039,946 mailed on Jun. 23, 2008, 11 pages.
Office Action for U.S. Appl. No. 11/161,092 dated Feb. 12, 2009.
Office Action for U.S. Appl. No. 11/188,274 dated Sep. 8, 2010. (19 pages).
Office Action for U.S. Appl. No. 11/161,093 dated Jun. 19, 2009.
Office Action for U.S. Appl. No. 11/161,091 dated Apr. 5, 2011.
Office Action for U.S. Appl. No. 11/187,508 dated Sep. 15, 2010.
Office Action for U.S. Appl. No. 11/324,131 dated Oct. 3, 2008.
Office Action for U.S. Appl. No. 11/161,091 dated Dec. 7, 2010.
Office Action for U.S. Appl. No. 11/187,512 dated Nov. 30, 2010.
Office Action for U.S. Appl. No. 11/187,508 dated Apr. 30, 2010.
Office Action for U.S. Appl. No. 11/187,508 dated Nov. 3, 2009.
Office Action for U.S. Appl. No. 11/324,131 dated Oct. 6, 2009.
Office Action for U.S. Appl. No. 11/324,131 dated Mar. 7, 2011.
Office Action for U.S. Appl. No. 11/324,131 dated Apr. 2, 2009.
Office Action for U.S. Appl. No. 11/324,131 dated May 27, 2010.
Office Action for U.S. Appl. No. 12/336,795 dated Dec. 16, 2010.
Office action for U.S. Appl. No. 11/161,090 dated Jun. 10, 2010.
Office Action for U.S. Appl. No. 11/161,093 dated Sep. 2, 2009.
Office Action for U.S. Appl. No. 11/039,946 dated Jan. 23, 2009.
Office Action for U.S. Appl. No. 11/039,946 dated Jun. 23, 2009.
Office action for U.S. Appl. No. 11/161,090 dated Jan. 6, 2010.
Office action for U.S. Appl. No. 11/161,090 dated May 28, 2009.
Office Action for U.S. Appl. No. 11/161,093 dated Jan. 2, 2009.
Office Action for U.S. Appl. No. 11/161,093 dated Feb. 22, 2010.
Office action for U.S. Appl. No. 11/161,091 dated Feb. 18, 2009.
Office action for U.S. Appl. No. 11/161,091 dated Feb. 24, 2010.
Office action for U.S. Appl. No. 11/161,091 dated Aug. 3, 2009.
Office Action for U.S. Appl. No. 11/187,512 dated Mar. 3, 2009.
Office Action for U.S. Appl. No. 11/187,512 dated Sep. 15, 2009.
Office Action for U.S. Appl. No. 11/187,562 dated Apr. 27, 2009.
Office Action for U.S. Appl. No. 11/161,656 dated May 13, 2009.
Office Action for U.S. Appl. No. 11/187,512 dated Dec. 23, 2009.
Office Action on U.S. Appl. No. 11/161,091 dated Oct. 5, 2011.
Office Action on U.S. Appl. No. 11/161,093 dated Nov. 3, 2011.
Office Action on U.S. Appl. No. 11/161,093 dated Jun. 28, 2011.
Office Action on U.S. Appl. No. 11/187,508 dated Dec. 20, 2011.
Office Action on U.S. Appl. No. 11/187,508 dated Jul. 6, 2011.
Office Action on U.S. Appl. No. 11/188,274 dated Oct. 18, 2011.
Office Action on U.S. Appl. No. 11/188,274 dated Jun. 27, 2011.
Office Action on U.S. Appl. No. 11/324,131 dated Jan. 4, 2012.
Office Action on U.S. Appl. No. 11/324,131 dated Aug. 11, 2011.
Office Action on U.S. Appl. No. 12/557,497 dated Nov. 18, 2010.
Office Action on U.S. Appl. No. 12/871,246 dated Sep. 27, 2011.
Official Notification from Israeli Patent Office, for Appl No. 184750 mailed Apr. 7, 2011.
Pedro Hernandez, "Tacit Adds to Softricity's Spark", Nov. 18, 2005. Available online at: www.enterpriseitplant.com/networking/news/article.php/3565401.
R. Briscoe, "The Implications of Pervasive Computing on Network Design," BT Technology Journal, pp. 170-190, Jul. 2004.
Ranzau et al., "Softricity/Tacit, An Innovative Approach to Virtual Computing," http://www.daboc.com/downloadnow.aspx?file=211&is=617, Oct. 20, 2005.
Restriction Requirement for U.S. Appl. No. 11/161,093 dated Jul. 26, 2010.(9 pages).
Supplementary European Search Report for EP04810901 dated Jul. 20, 2011.
Teruhara Serada, "SSL VPN", N+1 Network LAN, vol. 21, No. 3, Mar. 1, 2003, pp. 25-40. (19 pages) (English Abstract).
Wang et al., Shield: Vulnerability-Driven Network Filters for Preventing Known Vulnerability Exploits, Feb. 2004, Microsoft Research, MSR-TR-2003-81.
Written Opinion for PCT/US2005/023914 dated May 7, 2007.
Written Opinion for PCT/US2005/047433 dated Jun. 30, 2007.
Written Opinion of the International Searching Authority to PCT/US04/37918, mailed on Apr. 27, 2005, 7 pages.
Written Opinion of the International Searching Authority to PCT/US2005/026296, mailed on Jan. 31, 2006.
Written Opinion of the International Searching Authority to PCT/US2005/026300; Mailed on Dec. 16, 2005, 7 pages.
Written Opinion of the International Searching Authority to PCT/US2005/028663; Mailed on Nov. 16, 2005, 7 pages.
Written Opinion of the International Searching Authority, PCT/US2007/066433, mailed Oct. 31, 2007.
Written Opinion of the ISA for PCT/US2005/022884, mailed on Jul. 8, 2008 (6 pages).
Yoshikazu Kobayashi, VPN service introduction, Computer & Network LAN, vol. 21, No. 3, Mar. 1, 2003, pp. 25-40. (19 pages) (English Abstract).
Office Action for U.S. Appl. No. 12/560,154 dated Feb. 4, 2011.

(56) References Cited

OTHER PUBLICATIONS

Office Action for U.S. Appl. No. 12/560,154 dated Sep. 1, 2010.
U.S. Appl. No. 10/988,004, filed Nov. 12, 2004.
U.S. Appl. No. 11/161,091, filed Jul. 22, 2005.
U.S. Appl. No. 11/161,092, filed Jul. 22, 2005.
U.S. Appl. No. 11/161,093, filed Jul. 22, 2005.
U.S. Appl. No. 11/039,946, filed Jan. 24, 2005.
U.S. Appl. No. 11/161,090, filed Jul. 22, 2005.
U.S. Appl. No. 11/188,274, filed Jul. 22, 2005.
U.S. Appl. No. 11/161,656, filed Aug. 11, 2005.
U.S. Appl. No. 11/187,562, filed Jul. 22, 2005.
U.S. Appl. No. 11/188,279, filed Jul. 22, 2005.
U.S. Appl. No. 11/187,508, filed Jul. 22, 2005.
U.S. Appl. No. 11/187,512, filed Jul. 22, 2005.
U.S. Appl. No. 11/187,513, filed Jul. 22, 2005.
U.S. Appl. No. 12/336,795, filed Dec. 17, 2008.
U.S. Appl. No. 12/557,497, filed Sep. 10, 2009.
U.S. Appl. No. 12/560,154, filed Sep. 15, 2009.
U.S. Appl. No. 12/787,231, filed May 25, 2010.
U.S. Appl. No. 12/794,446, filed Jun. 4, 2010.
U.S. Appl. No. 13/149,383, filed May 31, 2011.
U.S. Appl. No. 13/739,895, filed Jan. 11, 2013.
U.S. Appl. No. 13/618,180, filed Sep. 14, 2012.
U.S. Appl. No. 12/871,246, filed Aug. 30, 2010.
"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.
EP Search Report issued Jul. 28, 2011 in European Application No. 04810901.1.
European Communication on 05763688.8 dated Dec. 20, 2011.
Exam Report for AU App. No. 2005272779 dated May 14, 2009.
Examination Report issued May 17, 2013 in Indian Patent Application No. 648/KOLNP/2007.
Examination Report on 3929/KOLNP/2006 dated Nov. 30, 2012.
Final Office Action dated Dec. 23, 2008 pertaining to U.S. Appl. No. 11/188,279. 12 pages.
Hu, et al., Adaptive Fast Path Architecture, IBM J. Res & Dev, vol. 45, Mar. 1, 2001, pp. 191-206. Retrieved from: http://gec.di.uminho.pt/discip/minf/ac0203/ICCA03IBM_WebCachArch.pdf.
Indian Examination Report on 3959/KOLNP/2006 dated Feb. 5, 2013.
Indian Examination Report on 531/KOLNP/2007 dated Feb. 8, 2013.
International Search Report for PCT/US2005/022884 dated Jul. 8, 2008.
Non-Final Office Action for U.S. Appl. No. 12/871,246 mailed Feb. 24, 2011.
Notice of Allowance for U.S. Appl. No. 11/188,279 dated Jun. 29, 2009.
Notice of Allowance in EP App 05785297.2 dated Jul. 6, 2012.
Notice of Allowance on U.S. Appl. No. 11/161,091 dated Sep. 28, 2012.
Notice of Allowance on U.S. Appl. No. 11/161,093 dated Jun. 18, 2012.
Notice of Allowance on U.S. Appl. No. 12/794,446 dated May 7, 2012.
Notice of Allowance on U.S. Appl. No. 12/871,246 dated Sep. 17, 2012.
Office Action dated Sep. 8, 2010 pertaining to U.S. Appl. No. 11/188,274 (15 pages).
Office Action for CN App. No. 200480040249.X dated Sep. 26, 2008.
Office action for European Application No. 05776653.7 dated Oct. 5, 2007. 7 Pages.
Office Action for IL App. No. 180403 dated Dec. 15, 2010.
Office Action for JP Appl. 2007-048002 dated Nov. 8, 2010. (7 pages) (English Abstract).
Office Action for U.S. Appl. No. 11/161,093 dated Feb. 3, 2011.
Office Action for U.S. Appl. No. 11/161,090 dated Feb. 4, 2009.
Office Action for U.S. Appl. No. 11/161,091 dated Aug. 5, 2008.
Office Action for U.S. Appl. No. 11/161,093 dated Oct. 1, 2010.
Office Action for U.S. Appl. No. 11/187,562 dated Dec. 9, 2008.
Office Action issued Apr. 8, 2013 in European Patent Application No. 04810901.1.
Office Action issued Jan. 2, 2001 in Israeli Patent Application No. 181269.
Office Action on U.S. Appl. No. 12/557,497 dated Nov. 19, 2010.
Office Action on U.S. Appl. No. 12/787,231 dated Apr. 11, 2013.
Office Action on U.S. Appl. No. 12/794,446 dated Nov. 23, 2011.
Office Action on U.S. Appl. No. 12/871,246 dated May 15, 2012.
Office Action on U.S. Appl. No. 13/739,895 dated Mar. 13, 2013.
US Notice of Allowance in U.S. Appl. No. 13/149,383 DTD May 28, 2013.
US Office Action in U.S. Appl. No. 13/149,383 DTD Jan. 29, 2013.
US Office Action in U.S. Appl. No. 11/187,508 DTD May 30, 2013.
US Notice of Allowance for U.S. Appl. No. 13/739,895 dated Mar. 24, 2014.
US Office Action for U.S. Appl. No. 12/874,927 dated Jan. 27, 2014.
US Office Action for U.S. Appl. No. 13/558,001 dated Jan. 13, 2014.

* cited by examiner

SYSTEM AND METHOD FOR ESTABLISHING A VIRTUAL PRIVATE NETWORK

RELATED APPLICATIONS

The present application claims priority to and is a continuation of U.S. patent application Ser. No. 12/794,446 entitled "SYSTEM AND METHOD FOR ESTABLISHING A VIRTUAL PRIVATE NETWORK", filed Jun. 4, 2010, which claims priority to and is a continuation of U.S. patent application Ser. No. 11/039,946, entitled "SYSTEM AND METHOD FOR ESTABLISHING A VIRTUAL PRIVATE NETWORK", filed Jan. 24, 2005, which claims priority to and is a non-provisional of U.S. Provisional Application No. 60/583,785, entitled "SYSTEM AND METHOD FOR ESTABLISHING A VIRTUAL PRIVATE NETWORK", filed Jun. 30, 2004, all of which are incorporated herein by reference in their entirety.

FIELD OF THE DISCLOSURE

The present invention relates generally to data communication networks. In particular, the present invention relates to establishing a virtual private network (VPN) between entities over a public data communication network, such as the Internet.

BACKGROUND

Enterprises are increasingly being asked to provide access to proprietary applications and data to employees and partners located outside the perimeter of the enterprise network. To do so in a cost-effective manner, enterprises are looking to leverage public networks such as the Internet for providing remote access. However, because the Internet is a publicly accessible network, issues of network security arise.

Multiple technologies are available for accomplishing secure Internet communications, including but not limited to those that rely on Secure Sockets Layer (SSL) encryption or Internet Protocol Security (IPSec) encryption. SSL encryption is incorporated into most Web browsers utilized by today's Internet users while IPSec presently is not.

SSL technology is limited, however, in its ability to provide remote access to a private network in that an SSL-encrypted client cannot directly access Domain Name Servers, Windows Internet Naming Service (WINS) Servers, or other resources on a private network that are not visible from outside the enterprise network but are essential to reaching resources on that network. In addition, firewalls typically block certain traffic through various ports and limit access to various Internet Protocol (IP) addresses automatically, thereby preventing SSL-encrypted clients from accessing certain destinations on the enterprise network. Finally, important applications such as various client-server e-mail programs and other enterprise application programs do not support SSL encryption natively and so limit the effectiveness of SSL in providing secure remote access to these resources.

Virtual private network (VPN) connections allow remote users and client programs (in other words, those that are not directly connected) to achieve encrypted remote access to a private data network via public internetworks (such as the Internet). Conventional approaches to setting up a VPN have included setting up remote access using pre-installed "thick clients" that are based on the IPSec standard or SSL and earlier versions of Web browser-based dynamic SSL VPN technology. Each is explained in more detail below.

VPN thick clients based on IPSec technology involve the transmission of whole packets over the Internet in encrypted form. Though robust and secure, IPSec technology has significant limitations. These limitations include, among other things, the administrative challenges in rolling out, managing, and maintaining the VPN client software for remote access users because every user must download and install the IPSec software on his or her computer. In addition, utilizing IPSec VPN technology, users cannot access key resources from alternate endpoints (in other words, any device on which the user has not installed the relevant software). Furthermore, user access to sites protected by firewalls is limited or, in some cases, nonexistent.

A conventional SSL version of the thick client avoids the firewall limitations of the IPSec thick client by using a standard SSL port that firewalls generally keep open. However, such an implementation still incurs the disadvantages of having to have the client software pre-installed from wherever the access takes place. These disadvantages include management complexity and the inability to provide access from any client computer equipped with a standard Web browser without the need for installing special software.

A conventional dynamic port proxy approach preserves the firewall traversing capabilities of an SSL thick client, and addresses the limitations of both IPSec and SSL thick clients by utilizing the built-in encryption capabilities of a Web browser, thereby obviating the need for installing special client software. In accordance with such an approach, a gateway device or program on an access server downloads a Java applet to monitor ports for encrypted traffic. If encrypted traffic is detected, the client sending the encrypted data is configured to re-direct its traffic through an applicable secure port. The problem with this technique, however, is that it works only for addresses that have names. In other words, it will not work with a static IP address or where the IP address and/or port of a server dynamically changes. Therefore, these implementations cannot handle applications that use dynamically assigned IP addresses, dynamically change ports, or use hardcoded IP addresses to reach unnamed resources.

What is desired, then, is a system and method for providing secure remote access to applications and data in an enterprise network over a public data communication network, such as the Internet, that improves upon and addresses the aforementioned shortcomings of conventional solutions.

BRIEF SUMMARY

In its broadest application, the present invention is directed to a system and method for establishing a virtual private network (VPN) between a client and a private data communication network, wherein the client is securely connected to the private data communication network via a public data communication network. In accordance with an embodiment of the present invention, the private data communication network comprises an enterprise network upon which reside applications and data that are proprietary to an enterprise, and the public data communication network comprises the Internet.

In a method in accordance with an embodiment of the present invention, an encrypted data communication session is established between a gateway or program on an access server and a client over a public data communication network. The communication session may be encrypted through various methods including, but not limited to Secure Sockets Layer (SSL) protocols, Internet Protocol Security (IPSec) or other encryption methods.

In response to the establishment of the encrypted data communication session, the gateway or program on the access server sends a program back to the client. In an embodiment, the program comprises a control or programming component (i.e., a self-sufficient program that can be run throughout the network environment) that is automatically installed and executed by a client Web browser. In an embodiment, once it been installed on the client, the program engages the ability to dynamically intercept communications from client applications destined for resources on the specified private data communication network by acting as an interceptor that is installed as a "hook" at a transport layer of the operating system on the client.

In an embodiment, the program can also act as a connection proxy for intercepted communications by providing an endpoint for such intercepted communications. The program can further introduce the ability to serve as an encryption endpoint in the encrypted data communication session and can direct such communications to the gateway or access server via the encrypted data communication session. In an alternative embodiment, the program can be separated into two or more separate programs—one performing the dynamic intercept functions on the client and a second performing, among other things, the network proxy and encryption functions.

An embodiment of the present invention includes the interception of name translation and connection requests by the program. A client and server communicating over a VPN in accordance with such an embodiment are free to use whatever IP addresses they choose as well as dynamically change those addresses at run time, since such an embodiment does not rely upon a static name to address translation.

When the gateway or access server receives encrypted communications from the client via the encrypted data communication session, it decrypts the encrypted communication and provides it to the appropriate destination resource on the private data communication network. In an embodiment, the gateway terminates the traffic (as a proxy) and is then able to further process the request as described below rather than simply sending it straight along to the destination on the private network. The gateway, in this embodiment, can carry out additional processing on the connection including but not limited to back-end encryption, serving responses out of a cache, local network load balancing, global service load balancing or compression.

If there are any responsive communications from the destination resource, these are directed to the gateway (and potentially encrypted where back-end encryption is utilized as described below) for transport to the installed client program via the encrypted data communication session. The installed client program decrypts the responsive communications and passes them to the appropriate client application.

In a specific method in accordance with an embodiment of the present invention, an encrypted data communication session, such as a Secure Sockets Layer (SSL) session is established between a gateway and a client over a public data communication network. The gateway then sends a first program to the client in response to establishment of the encrypted data communication session. In an embodiment, the first program comprises dynamically delivered program components, such as an ActiveX control that is automatically installed and executed by a client Web browser. Other such components may be a Java applet, Java Script, dynamic shared library or other such program components.

When the first program is executed by the client, among other things, it installs a second program on the client. The second program operates to intercept communications from client applications destined for resources on the private data communication network. The second program also operates to provide the intercepted communications to the first program for sending to the gateway via the encrypted data communication session instead of directly to the resources on the private data communication network. In an embodiment, the second program comprises a dynamic interceptor, for example a filter device driver, that is installed as a "hook" at a transport layer of an operating system of the client.

In an embodiment, the first program acts as a connection proxy, providing an endpoint for the intercepted communications. Other non-preinstalled SSL VPNs, including the Port Proxy, are not able to act as proxy for every connection but instead serve as endpoint only for those named resources and ports that the Port Proxy is pre-configured to support.

When the gateway receives encrypted communications from the client via the encrypted data communication session established by the program components, it decrypts the encrypted communication and provides it to the appropriate destination resource on the private data communication network.

In another embodiment, the gateway can serve as an intermediate proxy for the application traffic sent via the VPN and is then able to further process the application requests rather than simply sending them straight along to the destination on the private network. This embodiment permits the gateway to carry out further processing on the connection such as back-end encryption, in which the traffic is re-encrypted by the gateway before delivery to the appropriate destination on the private data communication network thereby enabling users to achieve additional network security. Furthermore, such processing can permit the gateway to serve responses out of a cache rather than requiring additional work by the destination resource. Alternatively or additionally, the gateway can perform local network load balancing, global service load balancing or compression on the connection data.

If there are any responsive communications from the destination resource, these are provided to the gateway (and potentially encrypted by the destination resource prior to transmission to the gateway in an embodiment where back-end encryption is utilized to provide end-to-end network security) for transport to the first program via the encrypted data communication session. The first program decrypts the responsive communications and passes them to the appropriate client application via the second program.

In accordance with an embodiment of the present invention, a user is not required to pre-install any software on a client system or device. Instead, the necessary components are dynamically installed on the client as a result of logging in to a gateway and subsequently removed at log out. This presents a distinct advantage over conventional solutions for secure remote access, such as solutions based on IPSec technology, wherein software must be preinstalled onto a client by a user.

Furthermore, in accordance with an embodiment of the present invention, communications from a client application to resources residing on a private data communication network are re-directed to a gateway based on interception of those communications. This is in direct contrast to conventional VPN solutions that utilize a dynamic port proxy, and therefore require a name to address translation on the client in order to operate. Because an embodiment of the present invention is based on interception of name translation and connection requests, rather than port proxy, a client and server communicating over a VPN in accordance with an embodiment of the present invention are free to use whatever IP addresses they choose as well as dynamically change those addresses at run time, since such an embodiment does not rely upon a static name to address translation. Thus, an embodiment of the present invention permits the use of hard-coded IP addresses, dynamic IP addresses and dynamic ports.

Additionally, an embodiment of the present invention provides a VPN solution that is based on proxying connections. For example, an embodiment of the present invention provides a connection proxying based encrypted tunnel for secure remote access that terminates the connection and is therefore able to extract out the TCP payload of the original connection and encapsulate such application payload into a new TCP payload, transmitted via a separate TCP connection. Conventional IPSec solutions encrypt all packets and use a tunnel established at the network packet layer for communication between devices. In other conventional SSL solutions, traffic from multiple applications might be transmitted by tunneling complete TCP packets, inclusive of all TCP headers, inside a new TCP connection established by the port proxy or other solution. The encapsulating connection is a second TCP connection that delivers the original connection intact, including all headers and without modification, to a gateway that unwraps the payload of the original connection from the capsule TCP connection and completes the delivery, again without modification, to the final private network destination.

This approach of threading of complete TCP connections inside other connections creates the potential for problems. Because TCP protocol generates slowdowns, retransmissions and acknowledgements following packet loss or packet delays, or perceived packet losses or delays, the doubled layers of TCP under the tunneling solution amplify any such packet losses or packet delays as the TCP protocol generates additional slowdowns, retransmissions and acknowledgments. Thus, new levels of delays and retransmissions significantly intensify the original slowdown and are a significant limitation to delivering multiple TCP payloads through a TCP-over-TCP connection tunnel.

In contrast, in an embodiment of the present invention, a separate encryption session tunnel is created for each application connection. Because each connection in such an embodiment is terminated or proxied and the TCP payload separated out and delivered over its own newly generated TCP connection, the embodiment may more easily avoid cascaded connection delays by avoiding TCP-over-TCP problems. Since the application payload is sent via a set of separate TCP connections, the loss of delay of a packet in the network affects only one connection and does not induce cascaded retransmissions unlike the tunneled case. Such an embodiment may also be easily integrated with additional connection-specific processing of application content traffic in the tunnel.

Because an embodiment of the present invention provides a VPN solution that acts as a proxy terminating connections at the client before encrypting such data and sending it over an SSL or other session tunnel, additional processing of such intercepted packets can be performed more effectively. Such processing can include DNS name resolution of such traffic in order to enable client applications to use whatever IP addresses they choose as well as dynamically change those addresses at run time as described above. Such additional processing also permits the invention to be effectively integrated with other technologies such as global service load balancing to achieve greater availability and greater efficiency among distributed gateways or servers. The above embodiment and the connection processing made possible thereby additionally also enables the present invention to keep detailed logs and statistics regarding the packets.

By making possible further connection-specific content processing of application data, an embodiment of the present invention also permits integration of VPN capabilities, such as SSL VPN capabilities, with other beneficial functions that may be provided by a gateway to an enterprise network. For example, an embodiment of the present invention permits integration of application layer optimization, switching and security features at the gateway. In particular, per-connection tunneling in accordance with an embodiment of the present invention permits easy integration of VPN features with request switching technology (as described in U.S. Pat. No. 6,411,986 issued Jun. 25, 2002 and entitled "Internet Client-Server Multiplexer" and in co-pending U.S. patent application Ser. No. 09/690,437, filed Oct. 18, 2000 and entitled "Apparatus, Method and Computer Program Product for Efficiently Pooling Connections Between Clients and Servers," each of which is incorporated by reference as if set forth fully herein) that is able to apply such application data processing capabilities at very high throughputs on multiple interleaved data streams simultaneously. The VPN features of an embodiment of the present invention may also be readily integrated with request level load balancing, Hypertext Transfer Protocol (HTTP) dynamic application caching, HTTP compression, Transmission Control Protocol (TCP) compression, defense against TCP and HTTP distributed denial of service attacks, HTTP virus defense scanning, and the like.

Finally, in an embodiment of the present invention, the integration of VPN features is extended by synchronizing the processing of the SSL decryption and end point processing described above with other processing of the connections to be carried out at the gateway including those described above such as load balancing, HTTP dynamic application caching, HTTP compression, TCP compression, defense against TCP and HTTP distributed denial of service attacks, HTTP virus defense scanning, and the like. In this way, an embodiment of the invention is able to deliver the benefits of such integrated processing which include: simplification of the network by avoiding having to interconnect several different systems to provide the combination of processing functions in specific order (e.g., compression before caching before encryption); an acceleration of processing by inspecting the application layer data once and taking multiple actions on it; simplification of administration by using a unified policy system to express actions to be taken, etc.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
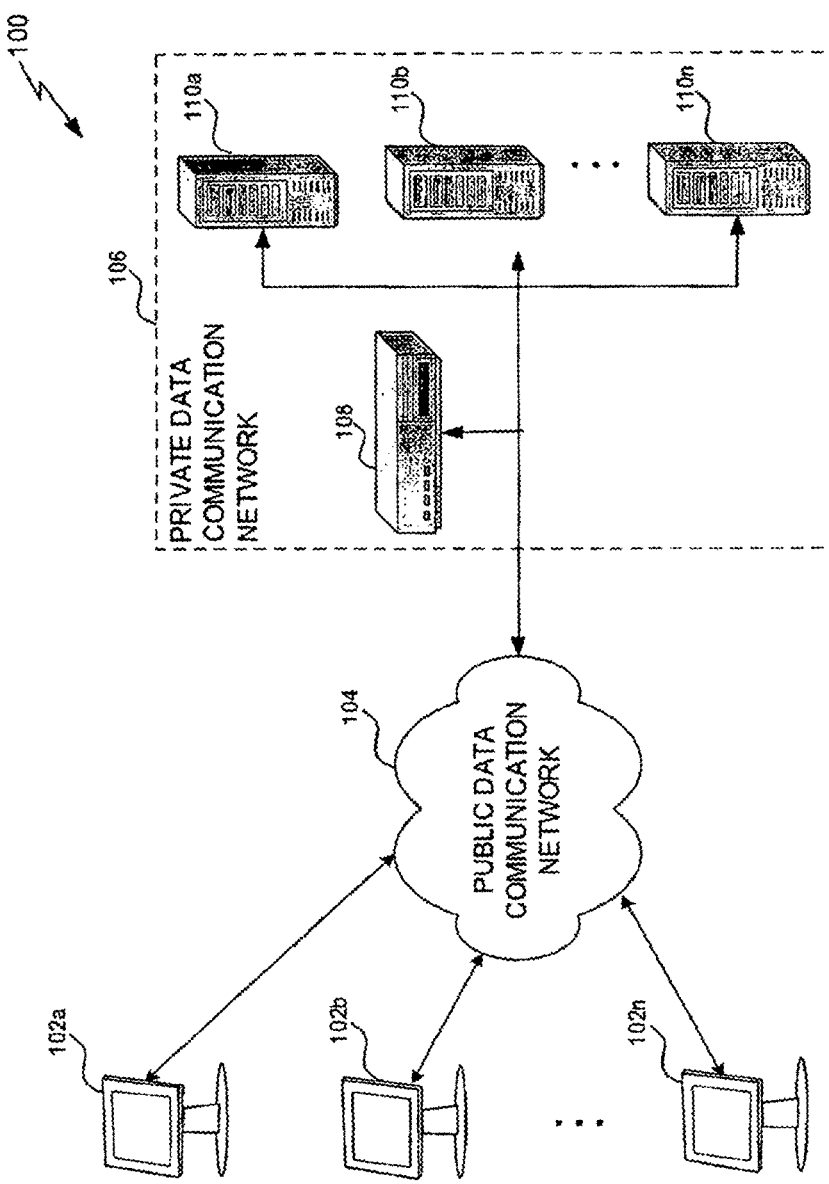
FIG. 1 depicts a system for establishing a virtual private network (VPN) in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

A. System for Establishing a Virtual Private Network

FIG. 1 depicts the basic elements of an exemplary system 100 for establishing a virtual private network (VPN) in accordance with an embodiment of the present invention. As shown in FIG. 1, system 100 includes a private data communication network 106 and a plurality of clients 102a through 102n that are remotely and communicatively connected to private data communication network 106 via a public data communication network 104. In an embodiment, private data communication network 106 comprises an enterprise network upon which reside applications and data that are proprietary to an enterprise, such as a private business organization, and public data communication network 104 comprises the Internet, although the invention is not so limited.

As further shown in FIG. 1, private data communication network 106 comprises a gateway 108 and a plurality of servers 110a through 110n. Gateway 108 is a system or device that acts as interface between entities on public data communication network 104 and resources on private data communication network 106. In particular, and as will be described in detail below, gateway 108 is configured to facilitate remote secure access by any one of clients 102a-102n to resources, such as applications and data, running or stored on servers 110a-110n.

In an embodiment, gateway 108 comprises a network server configured to perform the features of the present invention in addition to various network tasks relating to optimization of Web-based and/or client-server applications, traffic management, and security. However, the invention is not so limited, and gateway 108 may comprise any network system or device that is configured to perform the features of the present invention.

Each client 102a-102n comprises a system or device adapted to communicate with other entities over public data communication network 104, including but not limited to gateway 108. As will be appreciated by persons skilled in the relevant art(s), a variety of conventional communication protocols may be used to implement communication between each client 102a-102n and other entities on public data communication network 104. For example, in an embodiment, a Transmission Control Protocol/Internet Protocol (TCP/IP) suite is used to establish links and transport data, while a Hypertext Transfer Protocol (HTTP) or File Transfer Protocol (FTP) application layer is used for client-server communication. However, these examples are illustrative. The present invention is not intended to be limited to a specific communication protocol or application, and other proprietary or non-proprietary network communication protocols and applications can be used.

In an embodiment, each client 102a-102n comprises a personal computer (PC) running under the control of an operating system and implementing a commercially-available Web browser for network communication. For example, each client 102a-102n may comprise a PC running a Microsoft Windows® operating system—and implementing a Microsoft Internet Explorer® Web browser. Alternately, each client 102a-102n may comprise a PC running a Macintosh® operating system and implementing a Netscape Navigator® Web browser. However, the invention is not limited to these examples, and other operating systems and browsers may be used. Additionally, the invention is not limited to personal computers, and each client 102a-102n may comprise any device or system capable of communicating over public data communication network 104, including but not limited to laptop computers, tablet computers, set-top boxes, and network-enabled televisions, handheld computers and mobile telephones.

B. Method for Establishing a Virtual Private Network

Figure 2:
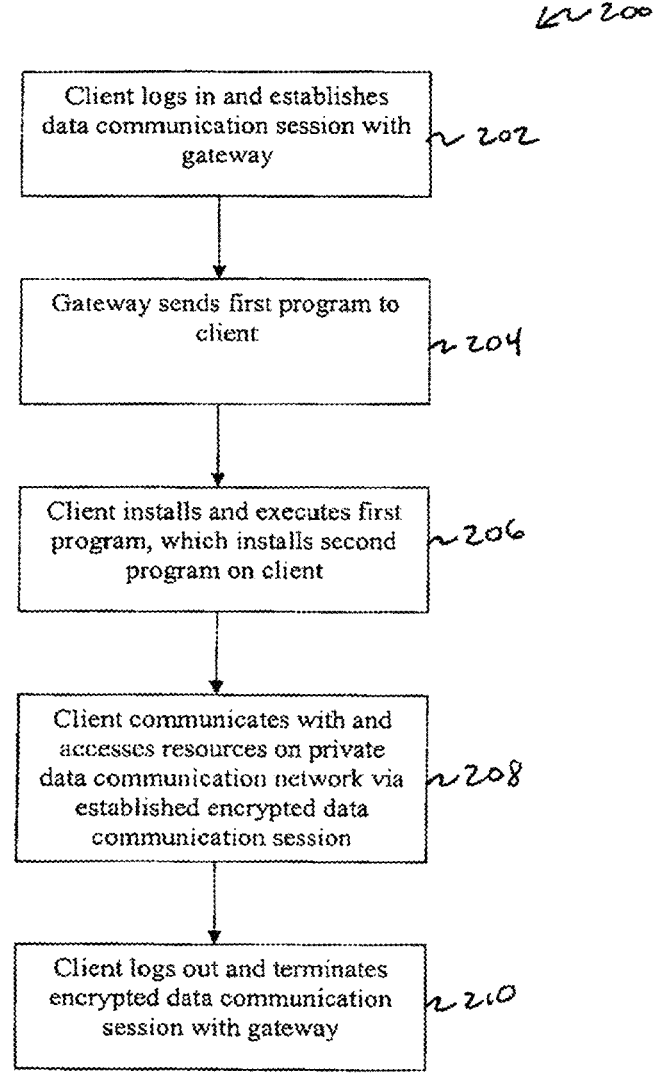
FIG. 2 illustrates a flowchart of a method for establishing a VPN in accordance with an embodiment of the present invention.

FIG. 2 illustrates a flowchart 200 of a method for establishing a VPN in accordance with an embodiment of the present invention. The invention, however, is not limited to the description provided by the flowchart 200. Rather, it will be apparent to persons skilled in the relevant art(s) from the teachings provided herein that other functional flows are within the scope and spirit of the present invention. Flowchart 200 will be described with continued reference to example system 100 described above in reference to FIG. 1. The invention, however, is not limited to that embodiment.

The method of flowchart 200 begins at step 202, in which one of clients 102a-102n (hereinafter generically referred to as client 102) performs a log in procedure and establishes an encrypted data communication session with gateway 108 via public data communication network 104. As will be described in more detail herein, the encrypted data communication session is used as a tunnel to bridge traffic from client 102 to any of servers 110a through 110n which reside behind gateway 108 in private data communication network 106. In an embodiment, client 102 uses a commercially-available Web browser, such as Microsoft Internet Explorer® or Netscape Navigator®, to log in and establish a data communication session with gateway 108 using Secure Sockets Layer (SSL) or other encryption methods including IPSec or others. A protocol such as Hypertext Transfer Protocol over Secure Sockets Layer (HTTPS) may be used to initiate the encrypted data communication session.

In response to log in and establishment of the encrypted data communication session, gateway 108 sends a first program to client 102 over public data communication network 104 as shown at step 204. The first program is configured to act as a tunnel endpoint for communication over the encrypted data communication session. In an embodiment, the first program comprises a plug-in application that is automatically installed and executed by the client Web browser. For example, the first program may comprise an ActiveX control that is provided as a plug-in to be executed by a Microsoft Internet Explorer® Web browser. Alternatively, the first program may comprise a Java applet that is provided as a plug-in to be executed by a Netscape Navigator® Web browser or another control or programming component that works across network environments.

At step 206, client 102 installs and executes the first program, wherein executing the first program comprises installing a second program on client 102. The second program is configured, in part, to intercept communications from applications running on client 102 that are destined for resources on private data communication network 106 and to provide the intercepted communications to the first program for sending to gateway 108 via the encrypted data communication session. The second program is also configured to provide intranet network name resolution service and optionally split network traffic. By splitting the traffic, an embodiment of the present invention is able to determine what traffic is channeled to an SSL tunnel and what is permitted to continue along for regular processing by the transport layer stack.

In an embodiment, the second program comprises a dynamic interceptor (for instance, a filter device driver) that is inserted as a "hook" into an operating system of client 102. For example, the second program may comprise a filter device driver that is attached to the transport layer stack of the client operating system, such as the transport layer stack of a Microsoft Windows® operating system.

As shown at step 208, once the first and second programs have been installed, applications running on client 102 may communicate with and access resources, such as applications and data, on private data communication network 106 via the established encrypted data communication session. The manner in which this communication occurs will be discussed in more detail below with respect to FIG. 3. Note that, in an alternative embodiment, the functions of the first program and second program as described above are performed by a single control or programming component (i.e., a self sufficient program that can be run throughout the network environment) that is automatically installed and executed by client 102.

At step 210, client 102 performs a log out procedure to disconnect from private data communication network 106, which terminates the encrypted data communication session with gateway 108. In an embodiment, at log out time, the first program automatically cleans up the modifications made to the client operating system to return the operating system to its original status.

Figure 3:
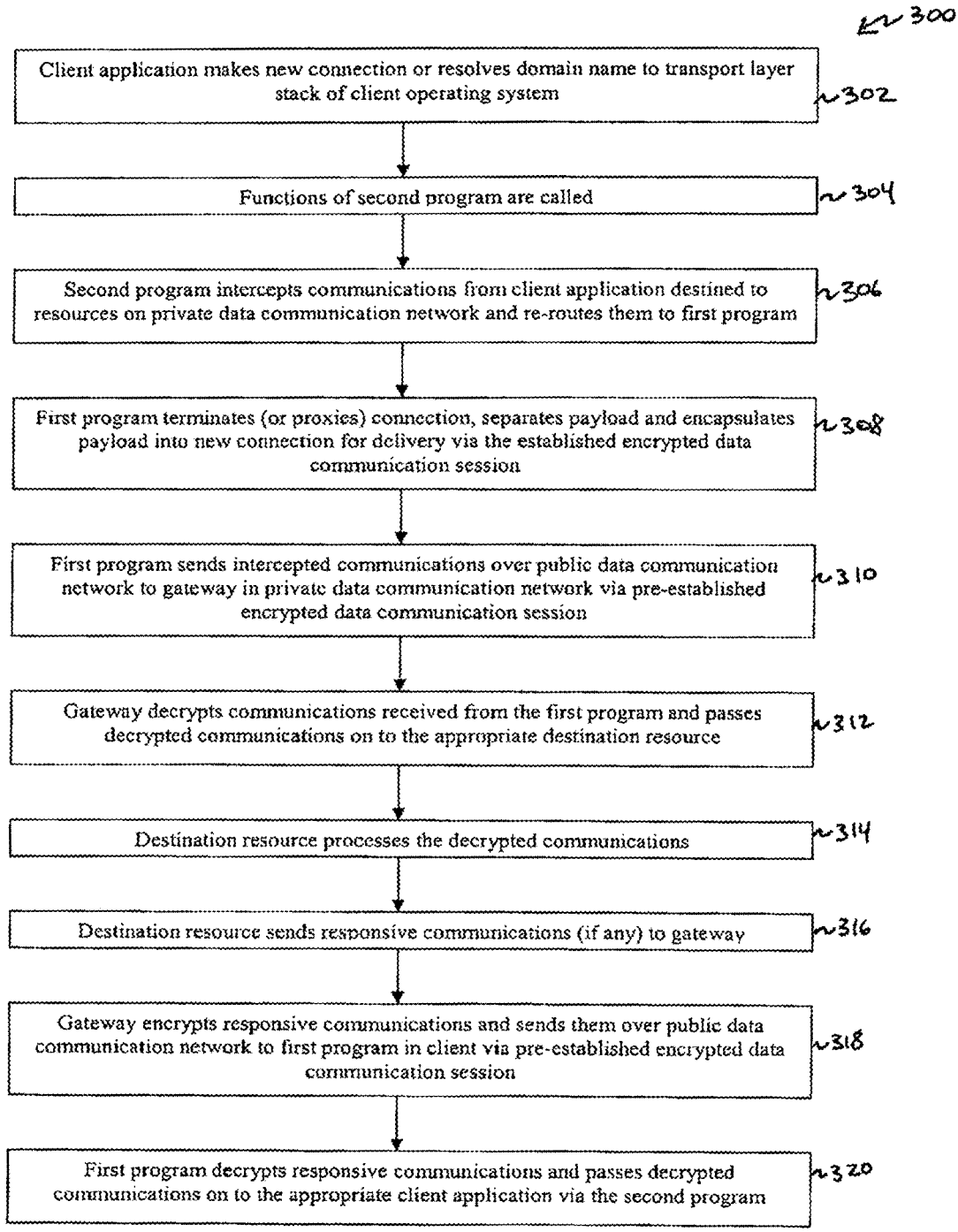
FIG. 3 illustrates a flowchart of a method by which a client communicates with and accesses resources on a private data communication network in accordance with an embodiment of the present invention and FIG. 4 illustrates an example computer system-based implementation of a client, server and/or gateway in accordance with embodiments of the present invention.

FIG. 3 illustrates a flowchart 300 of a method by which a client communicates with and accesses resources on a private data communication network in accordance with an embodiment of the present invention. In particular, the method of flowchart 300 represents one method by which step 208 of flowchart 200 may be carried out.

The method of flowchart 300 begins at step 302, in which a client application makes a new connection or resolves a domain name to the transport layer stack of the client operating system. When this occurs, the functions of the second program are automatically called before any transport layer functions are initiated, as shown at step 304. As described above, in an embodiment, the second program comprises a dynamic interceptor such as a filter device driver attached to the transport layer stack of the client operating system.

At step 306, the second program intercepts communications from the client application that are destined for resources on private data communication network 106 and re-routes them to the first program, which in an embodiment comprises an ActiveX control plug-in, a Java applet or other control or programming component that works across network environments.

At step 308, each intercepted connection is terminated or proxied and the first program separates out the payload and encapsulates the payload into a new connection for delivery via the established encrypted data communication session. In an embodiment, the payload is a TCP payload and is encapsulated into a new TCP connection.

At step 310, the first program sends the intercepted communications over public data communication network 104 to gateway 108 in private data communication network 106 via the pre-established encrypted data communication session, which includes encrypting the intercepted communications and sending the encrypted intercepted communications to gateway 108. In an embodiment, encryption is carried out in accordance with SSL protocols.

At step 312, gateway 108 acts as a proxy terminating the connection sent by the first program and decrypts the communications received from the first program on client 102 and passes the decrypted communications on to the appropriate destination resource on private network 106 via a different connection that the gateway 108 has established with the destination resource on private network 106. In an embodiment, decryption is carried out in accordance with SSL protocols or other applicable encryption and decryption protocols. At step 314, the destination resource processes the decrypted communications.

If the decrypted communications include a request for which there is a response, then the destination resource sends out responsive communications to gateway 108, as shown at step 316. At step 318, gateway 108 sends the responsive communications over public data communication network 104 to the first program on client 102 via the pre-established encrypted data communication session, which includes encrypting the responsive communications and sending the encrypted responsive communications to the first program. In an embodiment, encryption is carried out in accordance with SSL protocols or other applicable encryption and decryption protocols.

At step 320, the first program decrypts the responsive communications and passes them on to the appropriate client application via the second program, which is attached to the transport layer stack of the client operating system.

In accordance with an alternate embodiment of the present invention, client 102 performs additional processing of the intercepted communications before sending them over public data communication network 104 at step 308. Because an embodiment of the present invention provides a VPN solution that acts as a proxy terminating connections at the client before encrypting such data and sending it over the pre-established encrypted data communication session, such additional processing can be performed more effectively. Such processing can include DNS name resolution of the intercepted communications in order to enable client applications to use whatever IP addresses they choose as well as dynamically change those addresses at run time. Such additional processing permits embodiments of the invention to be effectively integrated with other technologies such as global service load balancing to achieve greater availability and greater efficiency among distributed gateways or servers. The additional connection processing can also enable the keeping of detailed logs and statistics regarding the intercepted communications.

In a further alternate embodiment of the present invention, gateway 108 terminates communications received from the first program on client 102 (as a proxy) and further processes one or more requests included therein rather than simply sending the communications straight along to a destination on private data communication network 106 as shown at step 312. This further processing can include back-end encryption wherein communications are re-encrypted by gateway 108 before delivery to the appropriate destination on private data communication network 106, thereby providing end-to-end network security. The destination will thereafter decrypt the traffic and respond appropriately. Further, such processing can permit gateway 108 to serve responses out of a cache rather than requiring additional work by a destination server, perform local network load balancing, global service load balancing and/or compression on the communications to enhance the efficiency and responsiveness of private data communication network 106.

In accordance with the above-described methods, a VPN based on an encrypted data communication session is established between client 102 and private data communication network 106. For example, in an embodiment, a secure VPN is established via HTTPS. Thereafter, all communications from client 102 to private data communication network 106 are routed via the first program to gateway 108, and vice-versa, through this encrypted data communication session.

It should be noted that although the encrypted data communication session may be established using HTTPS, the communications that are passed through the encrypted data communication session need not be HTTPS packet data or even HTTP packet data. For example, the communications may also comprise Transmission Control Protocol/User Datagram Protocol (TCP/UDP) or Internet Control Message Protocol (ICMP) packet data, although these examples are not intended to be limiting.

It should also be noted that although various client-side functions of an embodiment of the present invention are described above as being performed by a first program and a second program, persons skilled in the relevant art(s) will readily appreciate that those functions can be performed by a single program or multiple programs.

Furthermore, although the method described in reference to FIG. 3 describes a request-response type communication between an application on client 102 and a resource on private data communication network 106, encrypted communications in accordance with the present invention need not be request-response based. Rather, the communications can be of any type. Thus, any client application that can establish a connection or communication session, such as a UDP session, can send and receive encrypted communications in accordance with an embodiment of the present invention.

The above-described method for establishing a VPN is connection proxying in that an encrypted data communication session is created by terminating the connection and encapsulating the TCP payload of the original connection into a new TCP connection for each application connection. This is in contrast to a conventional IPSec approach, in which an encryption tunnel is developed on the network packet level and is therefore not tied to any particular application or communication session.

The above-described method is also distinguished from other conventional SSL solutions such as the Port Proxy approach where each connection is encapsulated as a complete entity inclusive of all TCP headers, inside a new encrypted TCP connection established by the port proxy. The encapsulating connection is a second, session-wide TCP connection that delivers the original connection intact including all headers and without modification to a gateway which unwraps the payload of the original connection from the capsule TCP connection and completes the delivery without modification to the final private network destination. The above described Port Proxy approach of threading of TCP connections inside other connections tunneled over an SSL connection can experience problems because TCP protocol generates slowdowns and retransmissions and acknowledgements in the event of packet loss and those delays and transmissions get significantly amplified where multiple complete TCP payloads are delivered through the single SSL TCP connection tunnel. The present embodiment avoids these delays by transmitting only the TCP payload of the terminated or proxied connection separated out and delivered via a separately established, new connection to the gateway.

Because an embodiment of the present invention provides a VPN solution that acts as a proxy terminating connections at the client before encrypting such data and sending it over an SSL session tunnel, the program is better able to manage connection based packet flows in a way that enables additional processing of such intercepted packets. Such additional processing permits the invention to be effectively integrated with other technologies such as global service load balancing to achieve greater availability and greater efficiency among distributed gateways or servers. The above embodiment and the additional connection processing also enables the present invention to keep detailed logs and statistics regarding the packets.

In addition, by implementing a connection-proxying based VPN where only the TCP payload of the original connection is transmitted through the secure VPN to the gateway, the above described method also permits integration at the gateway of the VPN with caching technologies that monitor Web object requests and store certain of those objects it retrieves from a server in order to improve network performance. Further, the above described method enables successful integration of the SSL VPN into other networking technologies including Load Balancing and TCP Buffering by proxying the connections at the gateway and thus creating the opportunity for further processing of the connection at the gateway.

Because the above-described method for establishing a VPN is connection-proxying based, it allows application data to be transferred in a manner that is also more compatible with Authentication, Authorization, and Accounting (AAA) policies, caching, compression, switching, multiplexing of connections, protection from SYN floods and other forms of attacks, and split tunneling than conventional VPN approaches. To illustrate the benefit of carrying out connection-proxying based VPN as described in the prior paragraph, the above-described method in which any additional processing of such connection that may be carried out at the gateway, including each of the methods described in the preceding paragraph, can be simply and efficiently carried out because the gateway serves as a proxy endpoint for the encrypted session. More specifically, in an embodiment, the gateway is able to carry out one or more forms of such processing as the gateway in the above-described method has terminated the connection and therefore such gateway can simply access and manipulate the TCP payload to perform such processing. By contrast, other approaches, including the connection tunneling approach, do not as a matter of course terminate the connection at the gateway (rather they proxy only the encrypted tunnel session) and therefore the approach requires a second level of processing to terminate the TCP connection that is tunneled inside the encrypted session. As a result of the requirement that the gateway carry out further processing on the connection, these approaches are inherently more complex and tend to be less efficient in carrying out additional functional processing on any such connection at the gateway.

Finally, in an embodiment, the integration of the VPN features of the present invention can be extended by synchronizing the processing of the SSL decryption and end point processing described above with other processing of the connections to be carried out at the gateway including those described above such as load balancing, HTTP dynamic application caching, HTTP compression, TCP compression, defense against TCP and HTTP distributed denial of service attacks, HTTP virus defense scanning, and the like.

In addition to the processing efficiencies described above, an embodiment of the present invention creates a separate TCP connection for each connection with the client or client control and terminates each such connection separately at the gateway and therefore provides the ability to simply and efficiently sequence the additional processing on each such connection.

In other approaches, including the connection tunneling approach, the gateway faces additional processing issues as previously described in the preceding paragraphs relating to the additional connection processing that must be carried out in contrast to the more efficient approaches of the present invention. Because multiple applications may be tunneled through a single encrypted session tunnel under this less efficient approach, the processing of the internal TCP connections at the gateway becomes more complex and less economical in its use of gateway processor resources. In this way, an embodiment of the invention improves the efficiency of integrating the processing at the gateway of the encryption session with other forms of processing.

Although the above-described methods are described in reference to embodiments in which communication is initiated by a client, the present invention also encompasses an embodiment in which communication is initiated by an entity on private data communication network 106. In accordance with such an embodiment, gateway 108 acts as a virtual client and entities on private communication network 106, such as servers 110a-110n, initiate communication with applications resident on any of clients 102a-102n. In such an embodiment, the VPN session is established in the same manner described above in reference to FIG. 3, but after the session is set up, either the client or the server can initiate a connection or communication session, such as a UDP session, to send communications to each other.

C. Exemplary Client/Server/Gateway

The functions of the present invention as respectively performed by each of clients 102a-102n, servers 110a-110n, and gateway 108n may be implemented using hardware, software, or a combination thereof and may be implemented in one or more computer systems or other processing systems. For example, FIG. 4 depicts an example computer system 400 that may be utilized to implement any of clients 102a-102n, servers 110a-110n, and/or gateway 108n in accordance with embodiments of the present invention.

Figure 4:
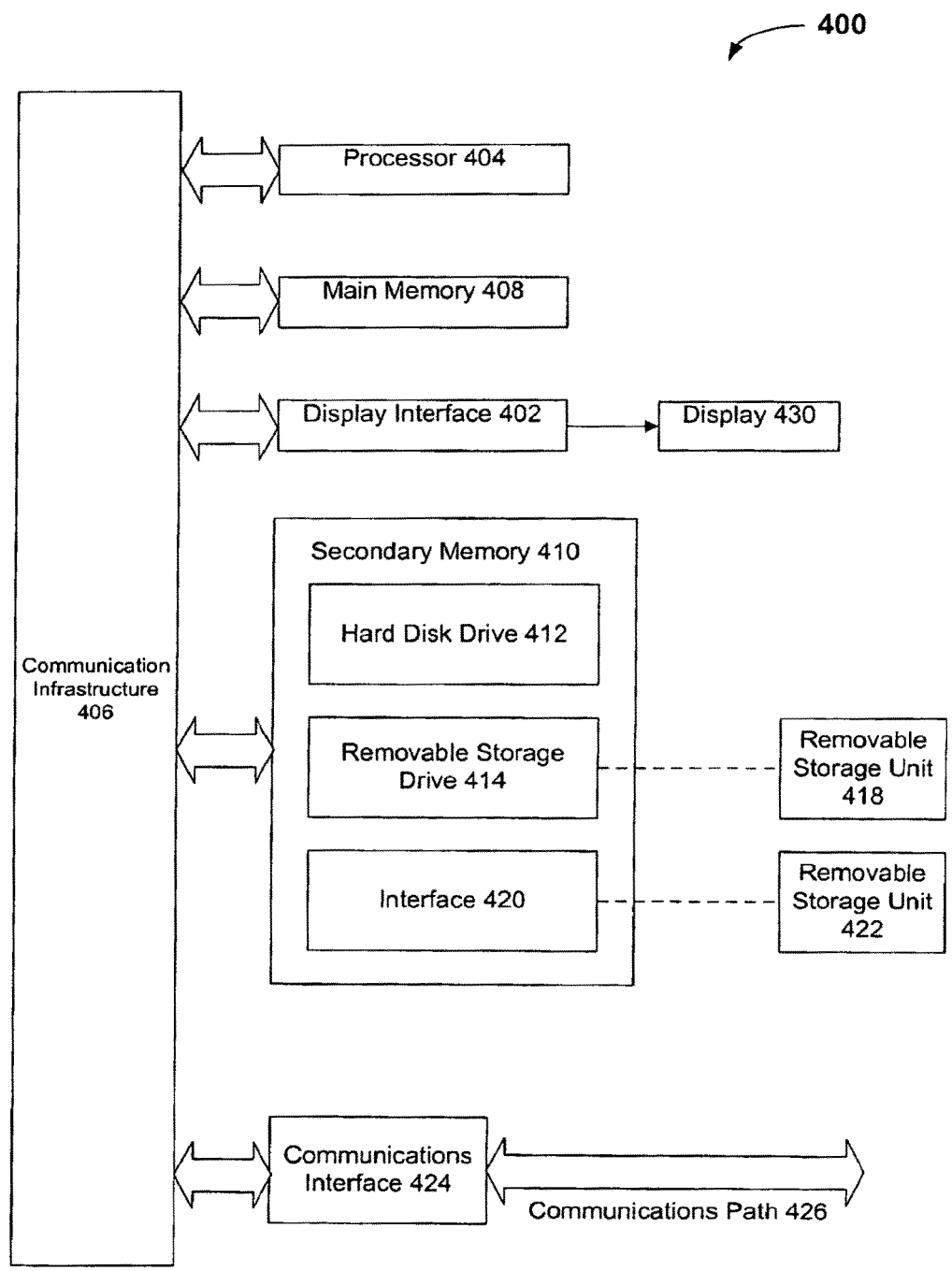

As shown in FIG. 4, the example computer system 400 includes a processor 404 for executing software routines in accordance with embodiments of the present invention. Although a single processor is shown for the sake of clarity, the computer system 400 may also comprise a multiprocessor system. The processor 404 is connected to a communication infrastructure 406 for communication with other components of the computer system 400. The communication infrastructure 406 may comprise, for example, a communications bus, cross-bar, or network.

Computer system 400 further includes a main memory 408, such as a random access memory (RAM), and a secondary memory 410. The secondary memory 410 may include, for example, a hard disk drive 412 and/or a removable storage drive 414, which may comprise a floppy disk drive, a magnetic tape drive, an optical disk drive, or the like. The removable storage drive 414 reads from and/or writes to a removable storage unit 418 in a well known manner. Removable storage unit 418 may comprise a floppy disk, magnetic tape, optical disk, or the like, which is read by and written to by removable storage drive 414. As will be appreciated by persons skilled in the relevant art(s), the removable storage unit 418 includes a computer usable storage medium having stored therein computer software and/or data.

In alternative embodiments, secondary memory 410 may include other similar means for allowing computer programs or other instructions to be loaded into computer system 400. Such means can include, for example, a removable storage unit 422 and an interface 420. Examples of a removable storage unit 422 and interface 420 include a program cartridge and cartridge interface (such as that found in video game console devices), a removable memory chip (such as an EPROM, or PROM) and associated socket, and other removable storage units 422 and interfaces 420 which allow software and data to be transferred from the removable storage unit 422 to computer system 400.

Computer system 400 further includes a display interface 402 that forwards graphics, text, and other data from the communication infrastructure 406 or from a frame buffer (riot shown) for display to a user on a display unit 430.

Computer system 400 also includes at least one communication interface 424. Communication interface 424 allows software and data to be transferred between computer system 400 and external devices via a communication path 426. In embodiments of the present invention, the communication interface 424 permits data to be transferred between the computer system 400 and a data communication network, such as public data communication network 104 or private data communication network 106. Examples of communications interface 424 can include a modem, a network interface (such as Ethernet card), a communications port, and the like. Software and data transferred via communications interface 424 are in the form of signals which can be electronic, electromagnetic, optical or other signals capable of being received by communications interface 424. These signals are provided to the communications interface via the communication path 426.

As used herein, the term "computer program product" may refer, in part, to removable storage unit 418, removable storage unit 422, a hard disk installed in hard disk drive 412, or a carrier wave carrying software over a communication path 426 (wireless link or cable) to communication interface 424. A computer useable medium can include magnetic media, optical media, or other recordable media, or media that transmits a carrier wave or other signal. These computer program products are means for providing software to computer system 400.

Computer programs (also called computer control logic) are stored in main memory 408 and/or secondary memory 410. Computer programs can also be received via communications interface 424. Such computer programs, when executed, enable the computer system 400 to perform one or more features of the present invention as discussed herein. In particular, the computer programs, when executed, enable the processor 404 to perform features of the present invention. Accordingly, such computer programs represent controllers of the computer system 400.

The present invention can be implemented as control logic in software, firmware, hardware or any combination thereof. In an embodiment where the invention is implemented using software, the software may be stored in a computer program product and loaded into computer system 400 using removable storage drive 414, hard disk drive 412, or interface 420. Alternatively, the computer program product may be downloaded to computer system 400 over communications path 426. The software, when executed by the processor 404, causes the processor 404 to perform functions of the invention as described herein.

D. Conclusion

While various embodiments of the present invention have been described above, it should be understood that they have been presented by way of example only, and not limitation. Thus, it will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

The invention claimed is:

1. A system comprising:
 a program executing on a client establishing a connection with a device intermediary to the client and a server;
 a driver of the client intercepting a packet transmitted by an application of the client to the server and providing the intercepted packet to the program; and
 wherein the program performs additional processing of the intercepted packet, comprising encapsulating payload from the intercepted packet, before transmitting the encapsulated payload of the intercepted packet via the connection.

2. The system of claim 1, wherein the additional processing comprises encrypting at least the payload of the intercepted packet.

3. The system of claim 1, wherein the additional processing comprises Domain Name Service (DNS) name resolution.

4. The system of claim 1, wherein the additional processing comprises dynamically changing internet protocol addresses.

5. The system of claim 1, wherein the additional processing comprises keeping a log regarding the intercepted packet.

6. The system of claim 1, wherein the additional processing comprises keeping statistics regarding the intercepted packet.

7. The system of claim 1, wherein the additional processing comprises integrating with a global server load balancing system.

8. The system of claim 1, wherein the program transmits the payload from the intercepted packet to the device via the connection.

9. The system of claim 1, wherein the program executes at an application layer of a network stack of the client and the driver operates at one or more layers below the application layer.

10. The system of claim 1, wherein the program terminates an end point of the connection with the device and the driver terminates a second connection of the application to the server.

11. A system comprising:
 a device intermediary to a client and a server, the device establishing a first connection with a program executing on the client, the program encapsulating payload from a packet intercepted by a driver from a transmission by an application of the client of the packet to the server, encrypting the encapsulated payload and transmitting communications comprising the encrypted encapsulated payload;
 wherein the device decrypts the communications received from the program and destined for the server; and
 wherein the device performs additional processing of the decrypted communications before transmitting to the server via a second connection between the device and the server.

12. The system of claim 11, wherein the device responsive to a request from the client to access the server, transmits the program to the client for installation and execution on the client, the program upon execution, installing a driver in a network stack of the client.

13. The system of claim 12, wherein the driver intercepts communications from the application and redirects the communications to the program.

14. The system of claim 11, wherein the additional processing comprises re-encrypting the decrypted communications before transmission to the server.

15. The system of claim 11, wherein the additional processing comprises load balancing the decrypted communications before transmission to the server.

16. The system of claim 11, wherein the additional processing comprises compressing the decrypted communications before transmission to the server.

17. The system of claim 11, wherein the additional processing comprises serving a response out of a cache of the device rather than transmitting the decrypted communications to the server.

18. The system of claim 11, wherein the additional processing comprises performing defense against denial of service attacks.

19. The system of claim 11, wherein the additional processing comprises performing virus scanning of the decrypted communications.

20. The system of claim 11, wherein responsive to transmitting the communications to the server, the device receives via the second connection a response from the server and encrypts and transmits the encrypted response via the first connection to the program.

* * * * *